(12) United States Patent
Kaita et al.

(10) Patent No.: US 8,395,355 B2
(45) Date of Patent: Mar. 12, 2013

(54) POWER SUPPLY SYSTEM AND VEHICLE WITH THE SYSTEM

(75) Inventors: Keiji Kaita, Aichi-ken (JP); Junta Izumi, Aichi-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 197 days.

(21) Appl. No.: 12/506,393

(22) Filed: Jul. 21, 2009

(65) Prior Publication Data

US 2010/0019729 A1 Jan. 28, 2010

(30) Foreign Application Priority Data

Jul. 25, 2008 (JP) ................................ 2008-192405

(51) Int. Cl.
 *H02J 7/00* (2006.01)
 *H02J 7/04* (2006.01)
 *H02J 7/16* (2006.01)
 *G01N 27/416* (2006.01)
 *B60K 1/00* (2006.01)

(52) U.S. Cl. ........ 320/134; 320/132; 320/149; 320/150; 324/427; 324/430; 324/433; 180/65.31; 180/68.5

(58) Field of Classification Search .................. 320/134, 320/132
See application file for complete search history.

(56) References Cited

U.S. PATENT DOCUMENTS

| | | | |
|---|---|---|---|
| 5,982,152 A | 11/1999 | Watanabe et al. | |
| 6,163,135 A * | 12/2000 | Nakayama et al. | 320/150 |
| 6,232,744 B1 * | 5/2001 | Kawai et al. | 320/132 |
| 6,344,732 B2 * | 2/2002 | Suzuki | 320/132 |
| 2003/0052647 A1 * | 3/2003 | Yoshida et al. | 320/125 |
| 2004/0222769 A1 * | 11/2004 | Al-Anbuky et al. | 320/128 |
| 2007/0018608 A1 * | 1/2007 | Okumura | 320/104 |
| 2007/0120537 A1 * | 5/2007 | Yamamoto | 320/150 |
| 2007/0152640 A1 * | 7/2007 | Sasaki et al. | 320/150 |
| 2008/0012535 A1 * | 1/2008 | Takatsuji et al. | 320/150 |
| 2008/0030171 A1 * | 2/2008 | Villefrance et al. | 320/150 |

(Continued)

FOREIGN PATENT DOCUMENTS

| | | |
|---|---|---|
| JP | 10164761 A | 6/1998 |
| JP | 10201111 A | 7/1998 |

(Continued)

OTHER PUBLICATIONS

Japanese Office Action for application No. 2008-192405 mailed May 11, 2010; 2 pages.

*Primary Examiner* — Drew A Dunn
*Assistant Examiner* — Nathaniel Pelton
(74) *Attorney, Agent, or Firm* — Gifford, Krass, Sprinkle, Anderson & Citkowski, P.C.

(57) ABSTRACT

A vehicle includes a charging unit receiving electric power from an external power source and externally charging a power storage unit. When a connector unit is coupled to the vehicle and a state ready for charging by the external power source is attained, a controller predicts degradation ratio of the power storage unit at the time point of completion of external charging based on degradation characteristic of the power storage unit in connection with SOC and battery temperature obtained in advance, and sets target state of charge of each power storage unit based on the battery temperatures so that the predicted degradation ratio does not exceed tolerable degradation ratio at the time point of completion of external charging. Then, the controller controls corresponding converters such that SOCs of power storage units attain the target states of charge.

10 Claims, 17 Drawing Sheets

U.S. PATENT DOCUMENTS

| | | | |
|---|---|---|---|
| 2008/0224667 A1* | 9/2008 | Tanaka et al. | 320/139 |
| 2008/0278118 A1* | 11/2008 | Labrunie et al. | 320/155 |
| 2009/0039831 A1* | 2/2009 | Ichikawa | 320/118 |
| 2009/0167253 A1* | 7/2009 | Muraoka et al. | 320/152 |
| 2009/0179616 A1* | 7/2009 | Ichikawa et al. | 320/134 |
| 2009/0234598 A1* | 9/2009 | Angquist et al. | 702/63 |
| 2010/0001866 A1 | 1/2010 | Ichikawa et al. | |
| 2010/0156352 A1* | 6/2010 | Muta et al. | 320/134 |

FOREIGN PATENT DOCUMENTS

| | | |
|---|---|---|
| JP | 10290535 A | 10/1998 |
| JP | 2001268719 A | 9/2001 |
| JP | 2005218285 A | 8/2005 |
| JP | 2007221868 A | 8/2007 |
| JP | 2008109755 A | 5/2008 |
| WO | WO-2008050623 A1 | 5/2008 |

* cited by examiner

POWER SUPPLY SYSTEM AND VEHICLE WITH THE SYSTEM

This nonprovisional application is based on Japanese Patent Application No. 2008-192405 filed on Jul. 25, 2008 with the Japan Patent Office, the entire contents of which are hereby incorporated by reference.

BACKGROUND OF THE INVENTION

1. Field of the Invention

The present invention relates to a power supply system and a vehicle provided with the system and, more specifically, to a power supply system including a power storage unit and a vehicle provided with the same.

2. Description of the Background Art

Recently, considering environmental issues, vehicles using electric motors as driving power sources such as electric vehicles, hybrid vehicles and fuel cell vehicles have attracting attention. On such a vehicle, a power storage unit formed by a secondary battery or an electric double layer capacitor is mounted, for supplying electric power to the motor or for converting kinetic energy to electric energy for storage at the time of regenerative braking.

In order to improve running performance of such a vehicle, the power storage unit must be of high reliability. Meanwhile, charging/discharging performance of the power storage unit much depends on the state of use, and over-charging or over-discharging leads to degradation.

Therefore, charge/discharge control of the power storage unit for reducing degradation of power storage unit has been proposed. By way of example, Japanese Patent Laying-Open No. 10-164761 discloses a control structure for a battery mounted on a hybrid vehicle, in which conditions for starting and ending battery charge are found not to cause internal heat generation at the power storage unit.

According to the disclosure, in order to reduce battery degradation caused by increased temperature, conditions for starting charging with optimal charge/discharge period in accordance with ambient temperature in a vehicle are found to be the battery charge starting conditions. Further, in order to reduce battery degradation caused by increased temperature, conditions for ending charging with optimal charge/discharge state (depth of discharge) in accordance with ambient temperature in a vehicle are found to be the battery charge ending conditions.

For a hybrid vehicle in which internal combustion engine and electric motor are efficiently combined for running, a structure has been proposed in which the power storage unit mounted on the vehicle is electrically connected to an external power source such as commercial power supply through a connector, to enable charging of the power storage unit from the external power source. When the power storage unit is charged beforehand from the external power source, running for a short distance such as commuting or shopping becomes possible with the internal combustion engine stopped, and general fuel consumption efficiency can be improved. Such charging of the power storage unit from external power source is sometimes referred to as external charging.

On the other hand, if a hybrid vehicle with such external charging mode is externally charged while the vehicle system is stopped, it follows that the power storage unit is left unused with high SOC (State of Charge) value, from the end of external charging to the next activation of the vehicle system.

Degree of degradation of power storage unit such as a secondary battery much differs dependent on the environment of usage, and degree of degradation may increase at a high temperature or at a high SOC state. Therefore, if the power storage unit is left unused in the high SOC state after completion of external charging, degradation of power storage unit is disadvantageously accelerated. Japanese Patent Laying-Open No. 10-164761 mentioned above is silent about any solution to such a problem.

SUMMARY OF THE INVENTION

An object of the present invention is to provide a power supply system capable of reducing degradation of power storage unit and a vehicle provided with the system.

According to an aspect, the present invention provides a power supply system supplying electric power to a load device mounted on a vehicle. The power supply system includes: a rechargeable power storage device; a temperature detecting unit for detecting temperature of the power storage device; a state estimating unit for estimating state of charge of the power storage device; a charging unit for externally charging the power storage device by receiving electric power from an external power source; and a control unit for controlling charging/discharging of the power storage device. The control unit includes a target value setting unit for setting, when the power storage device attains to a state ready for charging by the external power source, a target state of charge of the power storage device in accordance with the temperature of the power storage device, and a charge control unit for controlling charging power to the power storage device such that state of charge of the power storage device attains to the target state of charge.

Preferably, the target value setting unit predicts degradation ratio of the power storage device at a time point of completion of external charging, based on degradation characteristic of the power storage device in connection with the state of charge and the temperature of power storage device obtained in advance, and sets the target state of charge in accordance with the temperature of power storage device such that predicted degradation ratio does not exceed tolerable degradation ratio at the time point of completion of external charging.

Preferably, the control unit further includes a temperature predicting unit for predicting the temperature of power storage device at the time point of completion of external charging, by estimating degree of temperature increase of the power storage device during execution of external charging. The target value setting unit predicts degradation ratio of the power storage device at a time point of completion of external charging, based on predicted temperature of the power storage device at the time point of completion of external charging predicted by the temperature predicting unit, and sets the target state of charge in accordance with the predicted temperature of the power storage device such that the predicted degradation ratio does not exceed tolerable degradation ratio at the time point of completion of external charging.

Preferably, the control unit further includes a temperature estimating unit for obtaining a required time period necessary from a starting time point of external charging until the external charging is completed and the power storage device is used, and estimating temporal change of temperature of the power storage device in the required time period, a degradation ratio calculating unit for calculating temporal change of degradation ratio of the power storage device in the required time period, based on the temporal change of temperature of the power storage device estimated by the temperature estimating unit and temporal change of state of charge of the power storage device, and a target value correcting unit for calculating an amount of degradation of the power storage device in the required time period based on an integration of temporal change of degradation ratio of the power storage device calculated by the degradation ratio calculating unit, and correcting the target state of charge in accordance with a result of comparison between the amount of degradation of the power storage device in the required time period and a preset tolerable amount of degradation.

Preferably, the target value correcting unit decreases the target state of charge, if the amount of degradation of the power storage device in the required time period is determined to exceed the tolerable amount of degradation.

Preferably, the control unit further includes a storage unit for learning a pattern of use of the power supply system and storing a learned value based on the learning. The temperature estimating unit obtains the required time period based on the learned value stored in the storage unit.

Preferably, the power supply system further includes a cooling mechanism for cooling the power storage device using a cooling medium. The control unit further includes a temperature estimating unit for obtaining a required time period necessary from a starting time point of external charging until the external charging is completed and the power storage device is used, and estimating temporal change of temperature of the power storage device in the required time period, a degradation ratio calculating unit for calculating a temporal change of degradation ratio of the power storage device in the required time period, based on the temporal change of temperature of the power storage device estimated by the temperature estimating unit and temporal change of state of charge of the power storage device, and a temperature control unit for calculating an amount of degradation of the power storage device in the required time period based on an integration of temporal change of degradation ratio of the power storage device calculated by the degradation ratio calculating unit, and controlling cooling performance of the cooling mechanism during execution of external charging, in accordance with a result of comparison between the amount of degradation of the power storage device in the required time period and a preset tolerable amount of degradation.

Preferably, the temperature control unit raises cooling performance of the cooling mechanism during execution of external charging, if the amount of degradation of the power storage device in the required time period is determined to exceed the tolerable amount of degradation.

Preferably, the control unit further includes a storage unit learning a pattern of use of the power supply system and storing a learned value based on the learning. The temperature estimating unit obtains the required time period based on the learned value stored in the storage unit.

Preferably, the temperature estimating unit estimates, when external charging is completed, temporal change of temperature of the power storage device in an unused time period of the power storage device from the time point of completion of external charging until the power storage device is used, based on a detected value from the temperature detecting unit. The degradation ratio calculating unit calculates temporal change of degradation ratio of the power storage device in the required time period, based on the temporal change of temperature of the power storage device in the unused time period estimated by the temperature estimating unit. The temperature control unit calculates an amount of degradation of the power storage device in the required time period based on an integration of temporal change of degradation ratio of the power storage device calculated by the degradation ratio calculating unit, and controls cooling performance of the cooling mechanism in the unused time period, in accordance with a result of comparison between the amount of degradation of the power storage device in the required time period and the tolerable amount of degradation.

Preferably, the temperature control unit raises cooling performance of the cooling mechanism in the unused time period, if the amount of degradation of the power storage device in the required time period is determined to exceed the tolerable amount of degradation.

Preferably, the vehicle includes an auxiliary load that operates receiving electric power from the power storage device. The temperature control unit operates the auxiliary load in the unused time period if the amount of degradation of the power storage device in the required time period is determined to exceed the tolerable amount of degradation.

Preferably, the power storage device includes a plurality of power storage units each formed to be rechargeable. The power supply system further includes: a plurality of voltage converting units provided corresponding to the plurality of power storage units, respectively; and a pair of power lines to which the plurality of voltage converting units are connected in parallel with each other. The state estimating unit estimates state of charge of each of the plurality of power storage units in an unused time period of the power storage device from a time point of completion of external charging until the power storage device is used. The control unit further includes a voltage conversion control unit for controlling the plurality of voltage converting units such that electric power is exchanged between a first power storage unit having relatively high state of charge and a second power storage unit having relatively low state of charge, if difference in state of charge between each of the plurality of power storage units exceeds a prescribed threshold value in the unused time period.

According to another aspect, the present invention provides a vehicle including any one of the power supply systems described above, and a driving force generating unit receiving electric power supplied from the power supply system and generating driving force.

According to the present invention, it is possible to reduce degradation of a power storage unit mounted on a vehicle having the external charging mode.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
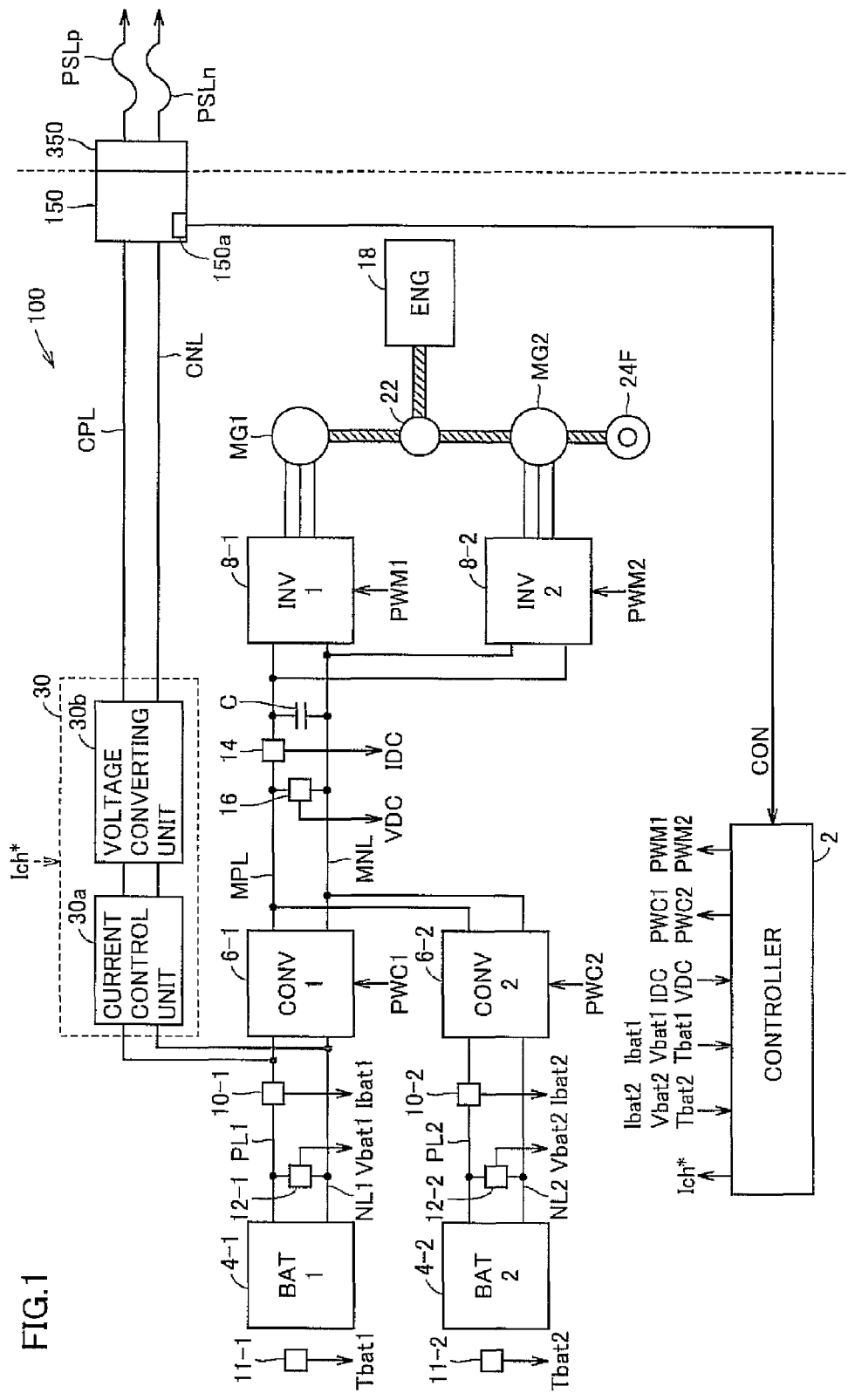
FIG. 1 is a schematic diagram showing a configuration for charging, by an external power source, a vehicle mounting the power supply system in accordance with an embodiment of the present invention.

In the following, embodiments of the present invention will be described in detail with reference to the figures. In the figures, the same reference characters denote the same or corresponding portions.

Embodiment 1

(Schematic Configuration of Vehicle)

FIG. 1 is a schematic diagram showing a configuration related to charging by an external power source of a vehicle 100 mounting the power supply system in accordance with Embodiment 1 of the present invention.

Referring to FIG. 1, vehicle 100 in accordance with Embodiment 1 of the present invention is represented by a hybrid vehicle mounting an internal combustion engine (engine) and a motor generator (MG), which runs with driving powers from these adjusted to an optimal ratio. Further, vehicle 100 has a plurality of (for example, two) power storage units mounted thereon, for supplying electric power to the motor generator. In a system activated state (hereinafter also referred to as "IG on state") of vehicle 100, these power storage units can be charged receiving power generated by an engine operation, and while the system of vehicle 100 is stopped (hereinafter also referred to as "IG off state"), the units can be electrically connected to an external power source through a connector unit 350 and charged. In the following description, to distinguish these charging operations from each other, charging of the power storage unit by an external power source will also be referred to as "external charging" and charging of the power storage unit by the engine operation will also be referred to as "internal charging."

Connector unit 350 serves as a coupling mechanism for supplying external power represented by commercial power supply to vehicle 100, and it is coupled to a charging station (not shown) through a power line PSL formed, for example, of a cabtyre cable. Connector unit 350 is coupled to vehicle 100 at the time of external charging, and electrically connects the external power source to charging unit 30 mounted on vehicle 100. On vehicle 100, a connector receptacle 150 is provided, which is coupled to connector unit 350 for receiving the external power source.

The external power supplied through connector unit 350 to vehicle 100 may be electric power generated by solar battery panel installed on a roof of a house in place of, or in addition to, the commercial power supply.

Vehicle 100 includes, as driving power sources, an engine (ENG) 18 and first and second motor generators MG1 and MG2, which are mechanically coupled by means of a power split device 22. In accordance with the state of running of vehicle 100, driving force is distributed or coupled among these three components through power split device 22 and, as a result, driving wheels 24F are driven.

While the vehicle 100 is running (that is, not during external charging), power split device 22 divides into two parts the driving power generated by the operation of engine 18, distributes one part to the first motor generator MG1 and distributes the remaining part to the second motor generator MG2. The driving power distributed from power split device 22 to first motor generator MG1 is used for an electric power generating operation, and the driving power distributed to second motor generator MG2 is combined with driving power generated by second motor generator MG2 and used for driving wheels 24F.

At this time, a first inverter (INV1) 8-1 and a second inverter (INV2) 8-2 corresponding to motor generators MG1 and MG2, respectively, convert DC power and AC power to each other. Mainly, the first inverter 8-1 converts AC power generated by first motor generator MG1 to DC power and supplies the same to a positive line MPL and a negative line MNL, in response to a switching command PWM1 from controller 2. On the other hand, the second inverter 8-2 converts DC power supplied through positive line MPL and negative line MNL to AC power and supplies the same to second motor generator MG2, in response to a switching command PWM2 from controller 2. Specifically, vehicle 100 includes the second motor generator MG2 capable of generating driving force upon receiving electric power from power storage units 4-1 and 4-2, and the first motor generator MG1 as a power generating unit capable of generating electric power upon receiving driving force from engine 18.

The first power storage unit (BAT1) 4-1 and the second power storage unit (BAT2) 4-2 are both rechargeable power storage elements typically implemented by a lithium ion or nickel hydride secondary battery, or a power storage element such as an electric double layer capacitor. Between the first power storage unit 4-1 and positive and negative lines MPL and MNL, a first converter (CONV1) 6-1 capable of voltage conversion of DC voltage is arranged, which steps up/down an input/output voltage of first power storage unit 4-1 and line voltage between the positive and negative lines MPL and MNL. Similarly, between the second power storage unit 4-2 and positive and negative lines MPL and MNL, a second converter (CONV2) 6-2 capable of voltage conversion of DC voltage is arranged, which steps up/down an input/output voltage of second power storage unit 4-2 and line voltage between the positive and negative lines MPL and MNL. Specifically, converters 6-1 and 6-2 are connected in parallel with the electric line pair of positive line MPL and negative line MNL. The stepping up/down operations of converters 6-1 and 6-2 are controlled in accordance with switching commands PWC1 and PWC2 from controller 2, respectively.

Controller 2 is typically implemented by an ECU (Electronic Control Unit) mainly including a CPU (Central Processing Unit), a storage unit such as an RAM (Random Access Memory) or an ROM (Read Only Memory), and an input/output interface. Controller 2 executes control related to vehicle running (including internal charging) and external charging, with the CPU reading a program stored in ROM or the like in advance to RAM and executing the program.

FIG. 1 shows examples of information input to controller 2, which include: battery currents Ibat1 and Ibat2 from current sensors 10-1 and 10-2 inserted to positive lines PL1 and PL2; a battery voltage Vbat1 from a voltage sensor 12-1 arranged between positive line PL1 and negative line NL1; a battery voltage Vbat2 from a voltage sensor 12-2 arranged between a positive line PL2 and a negative line NL2; battery temperatures Tbat1 and Tbat2 from temperature sensors 11-1 and 11-2 arranged close to power storage units 4-1 and 4-2; a positive power line current IDC from a current sensor 14 inserted to positive power liner MPL and a positive power line voltage VDC from a voltage sensor 16 arranged between the positive power line MPL and negative power line MNL.

Further, controller 2 continuously estimates state of charge (SOC; hereinafter also simply denoted as SOC) of power storage units 4-1 and 4-2. Though SOC may be represented as an absolute value of charging (unit: [A·h]) of the storage unit, in the present specification, it will be represented as a ratio (0 to 100%) of the amount of charges to the charging capacity of power storage unit. Specifically, controller 2 successively calculates SOC of first power storage unit 4-1 based on integrated value of charge/discharge amount of first power storage unit 4-1, and successively calculates SOC of second power storage unit 4-2 based on integrated value of charge/discharge amount of second power storage unit 4-2. The integrated value of charge/discharge amount is obtained by integrating over time the product (electric power) of battery voltage and battery current of the corresponding power storage unit.

Vehicle 100 further includes, as a structure for externally charging power storage units 4-1 and 4-2, a connector receptacle 150 and a charging unit 30. When power storage units 4-1 and 4-2 are to be externally charged, connector unit 350 is coupled to connector receptacle 150, whereby electric power from external power source is supplied to charging unit 30 through a positive charge line PCL and a negative charge line NCL. Further, connector receptacle 150 includes a coupling detection sensor 150a for detecting state of connection between connector receptacle 150 and connector unit 350, and by a coupling signal CON from coupling detection sensor 150a, controller 2 detects a state ready for charging by the external power source. In the present embodiment, a single-phase AC commercial power source is used as an example of the external power source.

In the present specification, the "state ready for charging by the external power source" typically represents a state in which connector unit 350 is physically inserted to connector receptacle 150. In place of the configuration shown in FIG. 1, a configuration for supplying electric power by electro-magnetically coupling the external power source and the vehicle in non-contact manner may be used, in which a primary coil is provided on the side of external power source and a secondary coil is provided on the vehicle side, and electric power is supplied utilizing mutual inductance between the primary and secondary coils. In that case, the "state ready for charging by the external power source" means a state in which the primary and secondary coils are positioned in place.

Charging unit 30 is a device for receiving electric power from the external power source and externally charging power storage units 4-1 and 4-2, and it is positioned between positive and negative lines PL1 and NL1 and positive and negative charge lines CPL and CNL. Specifically, charging unit 30 is electrically connected between the first power storage unit 4-1 and the first converter 6-1 corresponding to the first power storage unit 4-1.

Further, charging unit 30 includes a current control unit 30a and a voltage converting unit 30b, and converts electric power from the external power source to electric power suitable for charging power storage units 4-1 and 4-2. Specifically, voltage converting unit 30b is a device for converting the voltage supplied form the external power source to a voltage suitable for charging power storage units 4-1 and 4-2, and typically, it is implemented by a wound transformer having a prescribed ratio of transformation or an AC-AC switching regulator. Further, current control unit 30a generates a DC voltage by rectifying AC voltage after voltage conversion by voltage converting unit 30b, and controls charging current to be supplied to power storage units 4-1 and 4-2 in accordance with a charge current command Ich* from controller 2. Current control unit 30a is typically implemented by a single-phase bridge circuit. In place of a configuration including current control unit 30a and voltage converting unit 30b, charging unit 30 may be realized by an AC-DC switching regulator.

Particularly, controller 2 in accordance with the present embodiment sets target values SOC1* and SOC2* of SOC (hereinafter also referred to as target state of charge) for power storage units 4-1 and 4-2, based on battery temperatures Tbat1 and Tbat2 of power storage units 4-1 and 4-2, when the state ready for charging by the external power source is attained. Then, it charges respective power storage units by controlling corresponding converters such that SOC for each of power storage units 4-1 and 4-2 attains the set target state of charge SOC*.

In this manner, by setting the target state of charge SOC* of power storage units 4-1 and 4-2 in accordance with battery temperature Tbat, degradation of power storage unit can be reduced. Specifically, the power storage unit represented by a secondary battery degrades differently dependent on the environment of use, and has degradation characteristic that it degrades more when left with high battery temperature Tbat or high SOC than in the charging/discharging operation during running of vehicle 100. Therefore, in a configuration in which charging by external power source is uniformly performed until the power storage unit is fully charged, degradation of power storage unit is significantly accelerated if the battery temperature of power storage unit is high. In contrast, controller 2 in accordance with the present embodiment sets the target state of charge SOC* to be relatively lower as the battery temperature Tbat becomes higher. Therefore, in a period from completion of charging of the power storage unit by the external power source until the vehicle enters the IG on state, it becomes possible to restrain degradation of the power storage unit.

As to the correspondence between the embodiment of present invention shown in FIG. 1 and the present invention, power storage units 4-1 and 4-2 correspond to the "power storage device," converters 6-1 and 6-2 correspond to the "voltage converting unit," positive power line MPL and negative power line MNL correspond to the "pair of power lines," and charging unit 30 corresponds to the "charging unit."

(Control Structure)

Next, referring to FIGS. 2 to 4, a control structure for realizing the operation of charging the power storage unit by an external power source in the power supply system in accordance with the present embodiment will be described.

Figure 2:
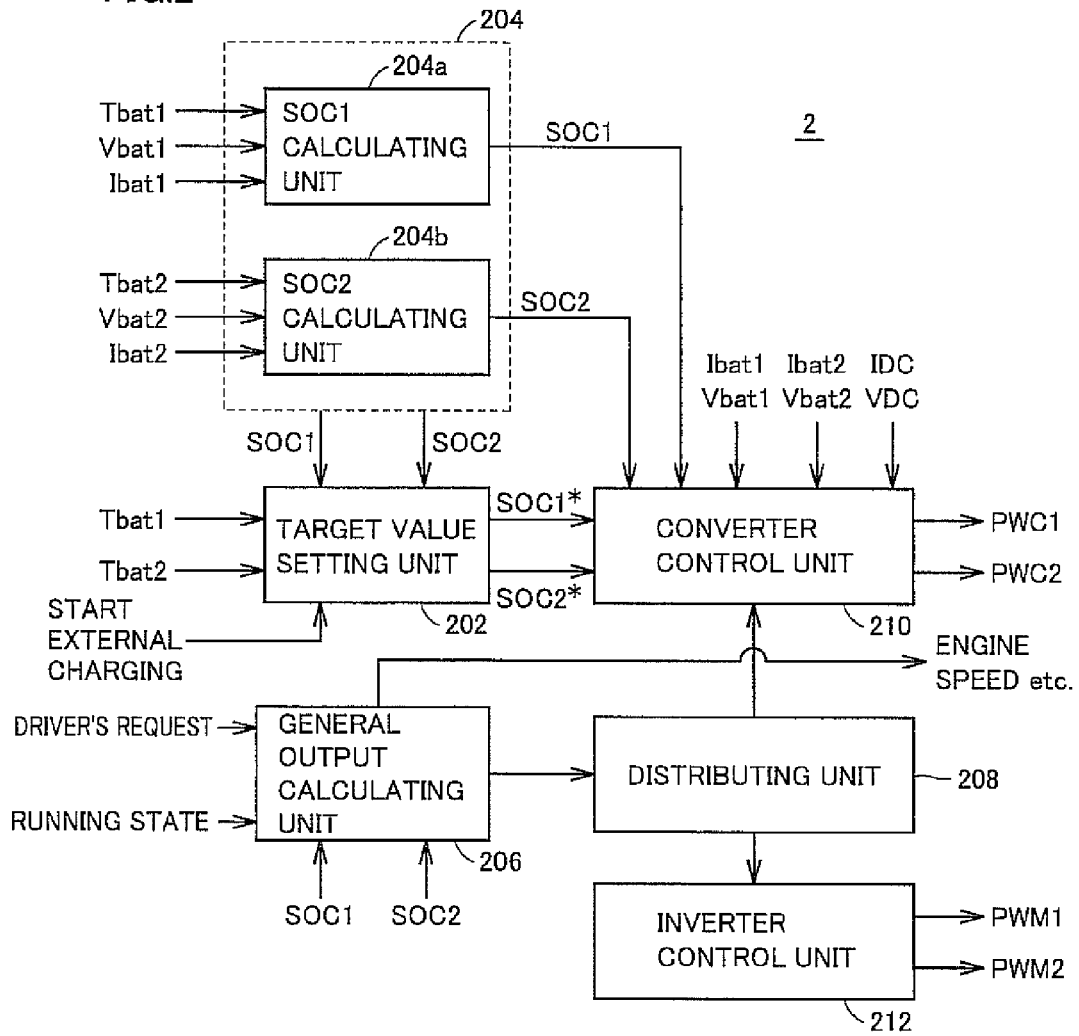
FIG. 2 is a block diagram showing a control structure of a controller 2 in accordance with Embodiment 1 of the present invention.

FIG. 2 is a block diagram showing the control structure of controller 2 in accordance with Embodiment 1. Each of the functional blocks shown in FIG. 2 is realized typically by controller 2 executing a program stored in advance. It is possible, however, to implement part of or all of the functions by hardware.

Referring to FIG. 2, controller 2 includes a target value setting unit 202, a state estimating unit 204, a general output calculating unit 206, a distributing unit 208, a converter control unit 210, and an inverter control unit 212, as its functions.

Receiving a signal to start external charging based on the coupling signal CON from coupling detection sensor 150a (FIG. 1), target value setting unit 202 sets target states of charge SOC1* and SOC2* for power storage units 4-1 and 4-2, based on battery temperatures Tbat1 and Tbat2 of power storage units 4-1 and 4-2, respectively, by a method described later.

State estimating unit 204 estimates SOC of each of power storage units 4-1 and 4-2 based on battery temperatures Tbat1 and Tbat2, battery currents Ibat1 and Ibat2, battery voltages Vbat1 and Vbat2 and so on. More specifically, state estimating unit 204 includes an SOC1 calculating unit 204a calculating SOC1 of first power storage unit 4-1 and an SOC2 calculating unit 204b calculating SOC2 of second power storage unit 4-2. SOC1 calculating unit 204a and SOC2 calculating unit 204b successively calculate SOC of respective power storage units, based on the integrated values of charge/discharge amount of corresponding power storage units, respectively.

General output calculating unit 206 calculates general output necessary for running of vehicle 100, in accordance with a driver's request and state of running. The driver's request includes stepping amount of an accelerator pedal, stepping amount of a brake pedal, and shift lever position (all not shown). Further, the state of running includes information indicating that vehicle 100 is accelerating or decelerating. General output calculating unit 206 determines engine speed and the like in accordance with the driving force of engine 18 necessary to realize the general output. Further, the result of calculation by general output calculating unit 206 is also transmitted to distributing unit 208.

In accordance with the result of calculation from general output calculating unit 206, distributing unit 208 calculates torque and numbers of rotation of motor generators MG1 and MG2, outputs a control command thereof to inverter control unit 212 and, at the same time, outputs a control command in accordance with demand and supply of electric power in vehicle 100 to converter control unit 210.

In response to the control command from distributing unit 208, inverter control unit 212 generates switching commands PWM1 and PWM2 for driving motor generators MG1 and MG2. Switching commands PWM1 and PWM2 are output to inverters 8-1 and 8-2, respectively.

In response to the control command from distributing unit 208, converter control unit 210 determines sharing rate of discharge power, with reference to SOC1 and SOC2 calculated at state estimating unit 204 such that prescribed discharging power is supplied from power storage units 4-1 and 4-2 to the second motor generator MG2. Then, converter control unit 210 generates switching commands PWC1 and PWC2 such that electric power to be shared is discharged from power storage unit 4-1 and 4-2, respectively. In accordance with switching commands PWC1 and PWC2, converters 6-1 and 6-2 perform voltage converting operations, whereby discharging power (discharging current) of power storage unit 4-1 and 4-2 are controlled, respectively.

Further, when the state ready for charging by the external power source is attained, converter control unit 210 controls the voltage converting operations by converters 6-1 and 6-2 such that SOC of power storage units 4-1 and 4-2 attains to the target states of charge SOC1* and SOC2* from target value setting unit 202.

Specifically, converter control unit 210 controls corresponding converters such that power storage units 4-1 and 4-2 are charged by charging current from charging unit 30, to realize substantially simultaneous completion of external charging of power storage units 4-1 and 4-2. At this time, converter control unit 210 calculates tolerable amount of charges until SOC of each of power storage units 4-1 and 4-2 attains the target state of charge SOC*, and controls the voltage converting operations of converters 6-1 and 6-2 such that power storage units 4-1 and 4-2 are charged with the charging current in accordance with the charging power sharing rate that corresponds to the calculated tolerable amount of charges. Consequently, difference in the period necessary to complete charging between power storage units can be reduced.

Next, referring to FIG. 3, the operation of setting target state of charge by target value setting unit 202 mentioned above will be described.

Figure 3:
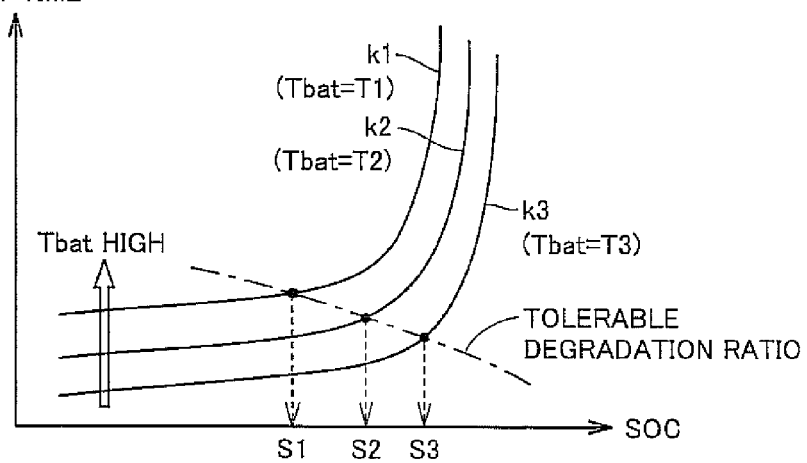
FIG. 3 illustrates degradation characteristics of power storage unit with respect to battery temperature and SOC.

FIG. 3 represents degradation characteristics of power storage unit with respect to battery temperature and SOC. The degradation characteristics of power storage unit shown in FIG. 3 are experimentally obtained using the battery temperature and SOC of the power storage unit as parameters, and stored in an ROM of controller 2 as a map for setting the target SOC, as will be described later.

Though description will be given assuming that the first and second power storage units 4-1 and 4-2 have the same degradation characteristics in the present embodiment, it is possible to obtain and store in advance the degradation characteristic of each power storage unit.

Referring to FIG. 3, the degradation characteristic of power storage unit is stored in the ROM, in the form of a degradation data table of SOC of a functional curve, with the abscissa representing SOC as a ratio (0 to 100%) of the amount of charges to the charging capacity of power storage unit and the ordinate representing ratio of degradation per unit time.

The ratio of degradation is an index representing the degree of degradation of power storage unit, evaluated using an output or internal resistance of the power storage unit. As the ratio of degradation, a capacity degradation rate representing the ratio of full charging capacity at present with respect to the full charging capacity before degradation may be used. The index representing the degree of degradation is not limited to the ratio of degradation, and an amount of degradation, ratio of voltage drop, or uniquely calculated degradation point may be used.

The degradation data table of SOC further includes the ratio of degradation dependent on battery temperature. Specifically, a line k1 in the graph represents the ratio of degradation in connection with SOC when battery temperature Tbat is T1, a line k2 represents the ratio of degradation in connection with SOC when battery temperature Tbat is T2

(<T1), and a line k3 represents the ratio of degradation in connection with SOC when battery temperature Tbat is T3 (<T2).

As is apparent from FIG. 3, the ratio of degradation in connection with SOC is larger in a range where SOC is relatively high than where SOC is relatively low. Particularly, in the range where SOC is relatively high, the ratio of degradation abruptly increases as SOC increases. As to the ratio of degradation in connection with battery temperature, it can be seen that the ratio of degradation increases as the battery temperature increases, even when SOC is the same.

Specifically, in a situation of high SOC and high battery temperature, the ratio of degradation increases significantly than in a situation of low SOC and low battery temperature. Therefore, it can be understood that from the completion of external charging until the vehicle enters the IG on state, degradation of power storage unit proceeds with the ratio of degradation depending on battery temperature.

Therefore, target value setting unit 202 stores the degradation characteristics of power storage unit shown in FIG. 3 as a map for setting target SOC in advance in the ROM and when the state ready for charging by the external power source is attained, it predicts ratio of degradation of power storage unit at the time of completion of charging of power storage unit by the external power source, based on the battery temperature Tbat from temperature sensors 11-1 and 11-2 (FIG. 1). Then, it sets the target state of charge SOC* such that the predicted ratio of degradation does not exceed the tolerable ratio of degradation defined in advance.

The tolerable ratio of degradation refers to the ratio of degradation acceptable at the storage unit after the completion of charging per one charging operation, defined in advance based on the life and the number of charge/discharge operations of the power storage unit. The tolerable ratio of degradation is calculated, for example, by dividing the tolerable amount of degradation as the amount of degradation acceptable per one charging operation by necessary time period until completion of charging (hereinafter also denoted as "time period for charge completion").

By such an arrangement, if battery temperature Tbat is T1, for example, the target state of charge SOC* is set with S1 as an upper limit, based on the degradation characteristic shown in FIG. 3. If battery temperature Tbat is T3, target state of charge SOC* is set with S3, which is higher than S1, as an upper limit. In this manner, degradation of power storage unit related to external charging can be reduced.

As to the correspondence between the embodiment of the present invention shown in FIG. 2 and the present invention, state estimating unit 204 corresponds to the "state estimating unit," target value setting unit 202 corresponds to the "target value setting unit," and converter control unit 210 corresponds to the "charge control unit."

Figure 4:
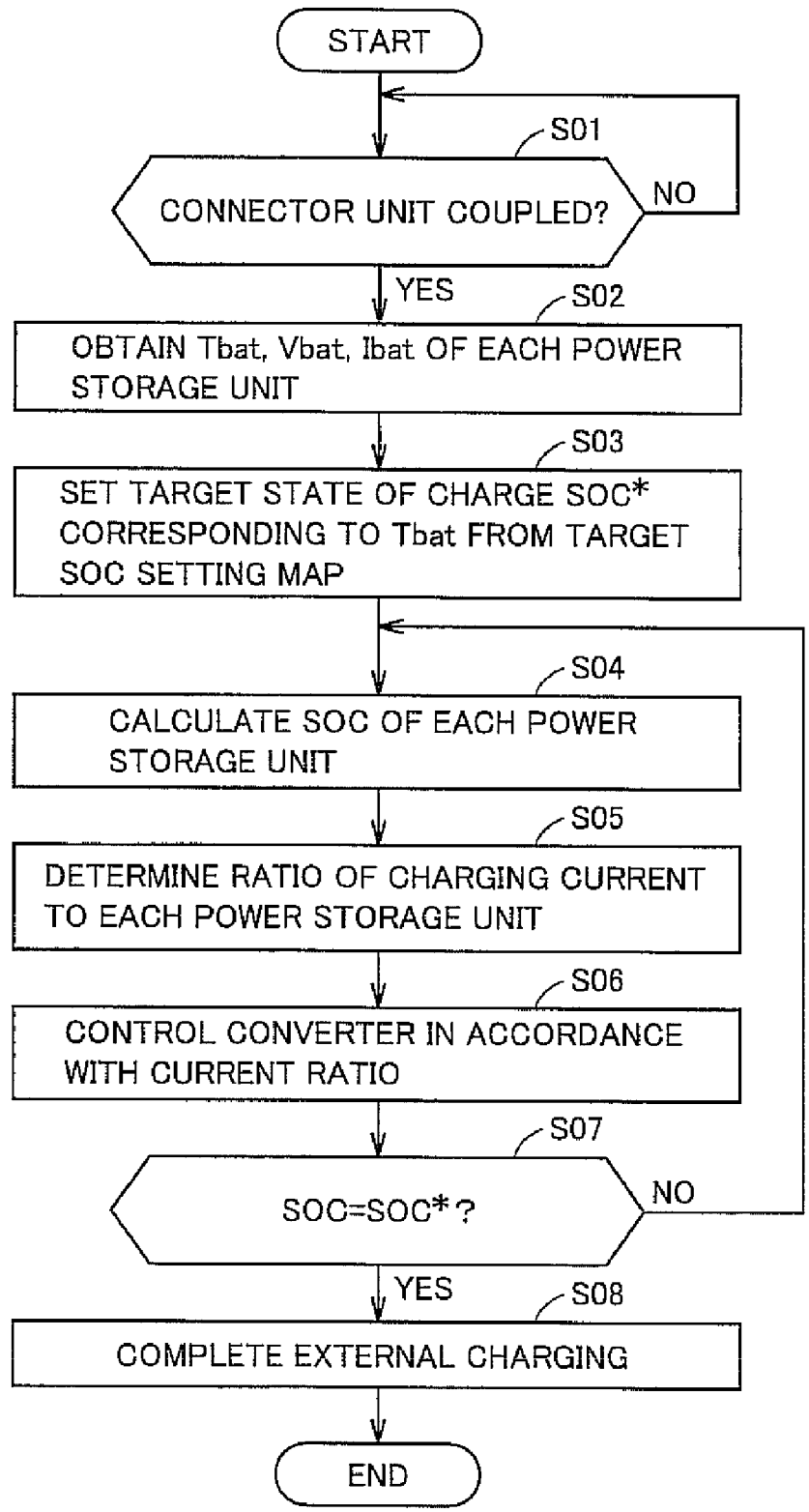
FIG. 4 is a flowchart representing process steps of an external charging operation in accordance with Embodiment 1 of the present invention.

FIG. 4 is a flowchart representing process steps of the external charging operation in accordance with Embodiment 1 of the present invention. Processes of respective steps shown in FIG. 4 are realized by controller 2 (FIG. 1) functioning as various control blocks shown in FIG. 2.

Referring to FIG. 4, target value setting unit 202 determines, based on a signal to start external charging based on the coupling signal CON from coupling detection sensor 150a (FIG. 1), whether or not connector unit 350 has been coupled to vehicle 100 (step S01).

If connector unit 350 is not coupled to vehicle 100 (NO at step S01), the process returns to the start.

On the contrary, if connector unit 350 has been coupled to vehicle 100 (YES at step S01), target value setting unit 202 determines that the state ready for charging by the external power source has been attained, and obtains from temperature sensors 11-1 and 11-2 (FIG. 1), battery temperatures Tbat1 and Tbat2 of power storage units 4-1 and 4-2. Further, state estimating unit 204 obtains battery temperatures Tbat1 and Tbat2, battery voltages Vbat1 and Vbat2, and battery currents Ibat1 and Ibat2 of power storage units 4-1 and 4-2, respectively (step S02).

Next, with reference to the map for setting target SOC shown in FIG. 3, target value setting unit 202 sets the target state of charge SOC1* for the first power storage unit 4-1, based on battery temperature Tbat1. Further, target value setting unit 202 sets the target state of charge SOC2* for the second power storage unit 4-2, based on battery temperature Tbat2 (step S03).

Further, state estimating unit 204 estimates SOC of each of power storage units 4-1 and 4-2, based on battery temperatures Tbat1 and Tbat2, battery voltages Vbat1 and Vbat2, battery currents Ibat1 and Ibat2, and so on (step S04).

Converter control unit 210 starts charging of power storage units 4-1 and 4-2 by the external power source, such that SOC of each of power storage units 4-1 and 4-2 attains to the target state of charge SOC* set at step S03. At this time, converter control unit 210 determines the ratio of charging currents to respective power storage units based on the tolerable amount of charges of power storage units 4-1 and 4-2 such that charging to all power storage units is completed substantially simultaneously (step S05), and controls the voltage converting operations by converters 6-1 and 6-2 in accordance with the determined current ratio (step S06).

Further, converter control unit 201 determines whether or not external charging of each power storage unit has been completed, based on the SOC successively calculated at state estimating unit 204. Specifically, converter control unit 210 determines whether the SOC of each power storage unit has reached the target state of charge SOC* (step S07). If the SOC of any of the power storage units does not match the target state of charge SOC* (NO at step S07), that is, if external charging of the power storage unit has not yet been completed, the process returns to step S04.

On the contrary, if the SOC of every power storage unit has reached the target state of charge SOC* (YES at step S07), that is, if external charging of all power storage units has been completed, the process related to the external charging operation ends.

As described above, according to Embodiment 1 of the present invention, if the state ready for charging by the external power source has been attained, target state of charge for the power storage unit is set in accordance with the battery temperature and, therefore, degradation of power storage unit related to external charging can be reduced.

Embodiment 2

Figure 5:
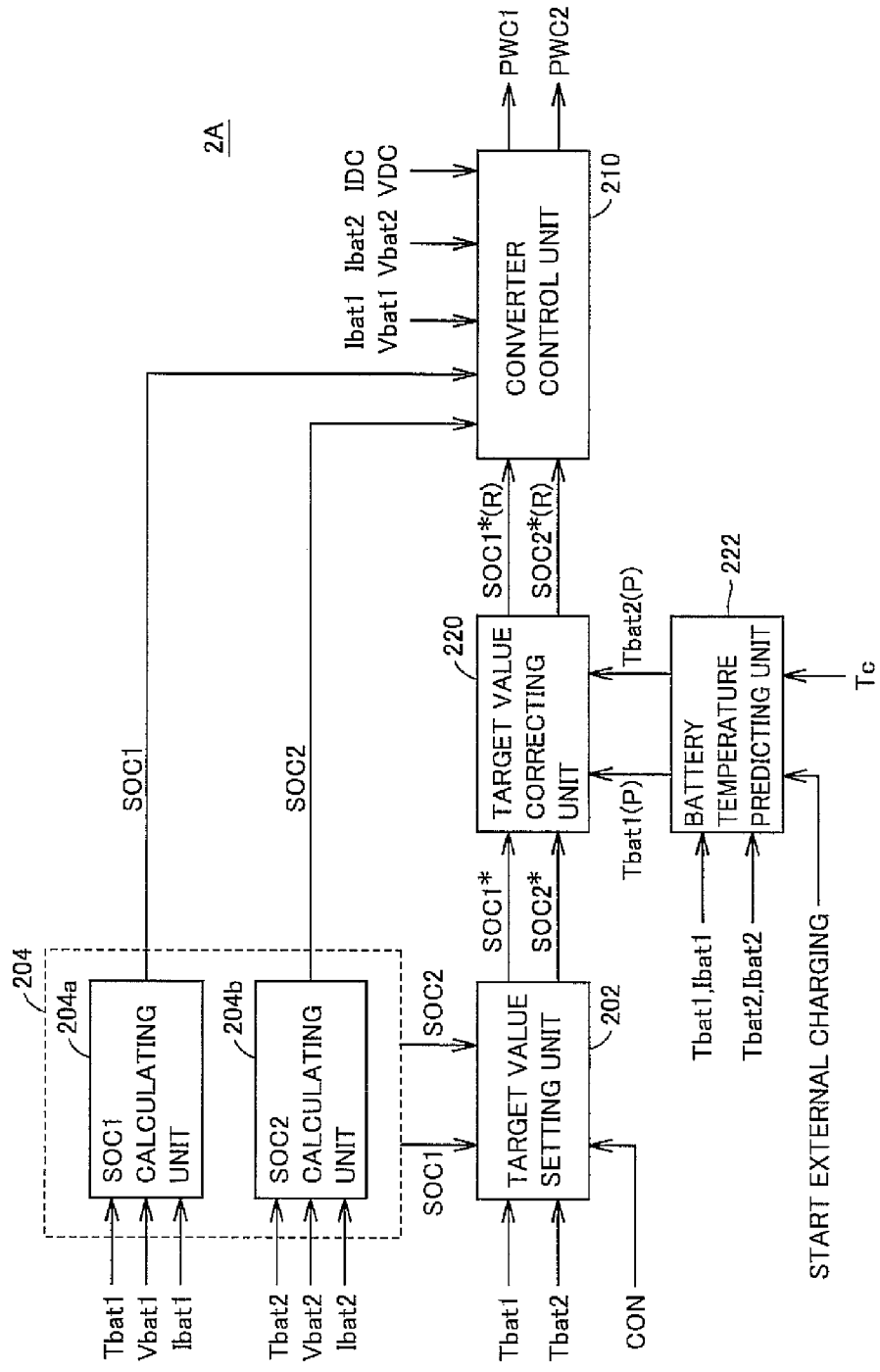
FIG. 5 is a block diagram showing a control structure of a controller 2A in accordance with Embodiment 2 of the present invention.

FIG. 5 is a block diagram showing a control structure of a controller 2A in accordance with Embodiment 2 of the present invention. Each of the functional blocks shown in FIG. 5 is typically realized by controller 2A executing a program stored in advance. It is noted, however, that part of or all of the functions may be implemented by dedicated hardware.

Referring to FIG. 5, controller 2A is equivalent to controller 2 in accordance with Embodiment 1 shown in FIG. 2 additionally including a target value correcting unit 220 and a battery temperature predicting unit 222 between target value setting unit 202 and converter control unit 210. Other portions of controller 2A have been described above and, therefore, detailed description will not be repeated.

Battery temperature predicting unit 222 estimates degree of increase of battery temperature during execution of external charging and thereby predicts battery temperatures Tbat1 and Tbat2 at the completion of external charging, for each of power storage units 4-1 and 4-2. Specifically, receiving the signal to start external charging based on the coupling signal CON from coupling detection sensor 150a (FIG. 1), battery temperature predicting unit 222 calculates predicted battery temperatures Tbat1(P) and Tbat2(P) of power storage units 4-1 and 4-2, respectively, at the time of completion of external charging, based on the SOC and the target state of charge SOC* of each of power storage units 4-1 and 4-2 as well as battery temperatures Tbat1 and Tbat2.

As an example, in the present embodiment, battery temperature predicting unit 222 calculates predicted battery temperature Tbat(P) at the time of completion of external charging, based on the difference between the amount of heat generation during execution of external charging and the amount of heat radiation attained by a cooling mechanism, for each of power storage units 4-1 and 4-2.

The cooling mechanism is a device for cooling power storage units 4-1 and 4-2 using cooling air as a cooling medium. Though not shown, it is configured such that air is introduced from a compartment air-conditioned by an air conditioner for cooling/heating the compartment, and the air is fed to power storage units 4-1 and 4-2 whereby power storage units 4-1 and 4-2 are cooled.

By way of example, the cooling mechanism is formed by an air inlet opened at a rear package tray, a duct portion guiding air from the compartment to a battery casing containing power storage units 4-1 and 4-2, and a cooling fan feeding the air introduced to the battery casing to power storage units 4-1 and 4-2. In this configuration, the downstream side of air flow in battery casing is communicated to the inside and outside of the compartment, and the air that has cooled power storage units 4-1 and 4-2 is discharged to the inside and outside of the compartment.

With such a configuration, battery temperature predicting unit 222 calculates the amount of heat generation at the first power storage unit 4-1 from the charging current to first power storage unit 4-1 and internal resistance of first power storage unit 4-1 (=square of charging current×internal resistance). Further, battery temperature predicting unit 222 calculates the amount of heat radiation per unit time of the first power storage unit 4-1, based on a difference between battery temperature Tbat1 detected by temperature sensor 11-1 and intake air temperature Tc detected by a temperature sensor provided at the duct portion of cooling mechanism mentioned above and on the amount of cooling medium Va supplied by the cooling fan.

Then, battery temperature predicting unit 222 integrates the difference between the calculated amount of heat generation and amount of heat radiation of the first power storage unit 4-1 for charge completion period Tch, which is the time period required for completion of external charging. The charge completion period Tch can be calculated by the following equation based on the difference between target state of charge SOC* and SOC1.

$$Tch=(SOC1^{*}-SOC1)\times Cb1/Pb1 \tag{1}$$

where Cb1 represents charging capacity of first power storage unit 4-1 and Pb1 represents charging power per unit time.

Finally, battery temperature predicting unit 222 calculates degree of increase of battery temperature based on the integrated value, and thereby calculates the predicted battery temperature Tbat1(P) of the first power storage unit 4-1 at the time of completion of external charging.

Battery temperature predicting unit 222 also calculates the predicted battery temperature Tbat2(P) of the second power storage unit 4-2 at the time of completion of external charging based on battery temperature Tbat2, SOC2 and target state of charge SOC2*, in the similar manner for the first power storage unit 4-1.

Receiving target states of charge SOC1* and SOC2* from target value setting unit 202, and receiving predicted battery temperatures Tbat1(P) and Tbat2(P) from battery temperature predicting unit 222, target value correcting unit 220 corrects the target state of charge SOC* for each of the power storage units based on the corresponding predicted battery temperature Tbat(P).

Specifically, target value correcting unit 220 again refers to the degradation characteristic (FIG. 3) of the power storage unit stored in the ROM, and predicts, based on the predicted battery temperature Tbat(P), the ratio of degradation of power storage unit at the time of completion of charging of the power storage unit by the external power source. Then, target value correcting unit 220 corrects the target state of charge SOC* such that the predicted ratio of degradation does not exceed the tolerable ratio of degradation.

Receiving the corrected target state of charge SOC*(R) from target value correcting unit 220, converter control unit 210 controls the voltage converting operations of converters 6-1 and 6-2 such that SOC of each of power storage units 4-1 and 4-2 attains to the target states of charge SOC1*(R) and SOC2*(R). At this time, converter control unit 210 calculates the tolerable amount of charging until the SOC of each of power storage units 4-1 and 4-2 attains to the target state of charge SOC*(R), and controls the voltage converting operations of converters 6-1 and 6-2 such that the power storage units 4-1 and 4-2 are charged with charging currents in accordance with the charging power share ratio based on the calculated ratio of tolerable amount of charging. Therefore, external charging of power storage units 4-1 and 4-2 ends substantially simultaneously.

As described above, controller 2A in accordance with the present embodiment predicts battery temperature at the time of completion of external charging by estimating degree of increase of battery temperature related to external charging, and in accordance with the predicted battery temperature, sets the target state of charge of the power storage unit. Therefore, as compared with the controller 2 in accordance with Embodiment 1 described above, degradation of power storage unit can more reliably be reduced.

Figure 6:
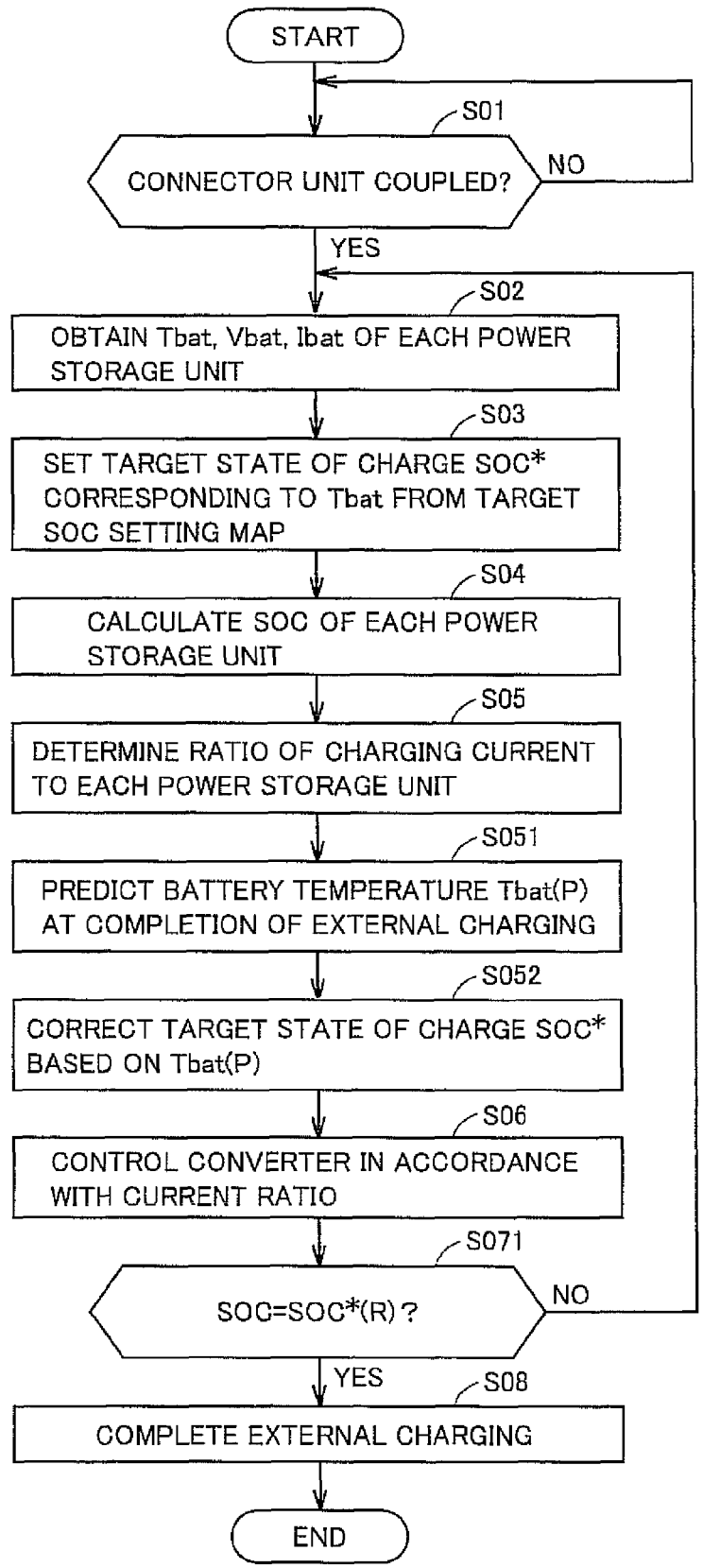
FIG. 6 is a flowchart representing process steps of an external charging operation in accordance with Embodiment 2 of the present invention.

FIG. 6 is a flowchart representing process steps of the external charging operation in accordance with Embodiment 2 of the present invention. Processes of various steps shown in FIG. 6 are realized by controller 2A functioning as each of the control blocks shown in FIG. 5.

Referring to FIG. 6, target value setting unit 202 determines, based on a signal to start external charging based on the coupling signal CON from coupling detection sensor 150a (FIG. 1), whether or not connector unit 350 has been coupled to vehicle 100 (step S01).

If connector unit 350 is not coupled to vehicle 100 (NO at step S01), the process returns to the start.

On the contrary, if connector unit 350 has been coupled to vehicle 100 (YES at step S01), target value setting unit 202 determines that the state ready for charging by the external power source has been attained, and obtains from temperature sensors 11-1 and 11-2 (FIG. 1), battery temperatures Tbat1 and Tbat2 of power storage units 4-1 and 4-2. Further, state estimating unit 204 obtains battery temperatures Tbat1 and Tbat2, battery voltages Vbat1 and Vbat2, and battery currents Ibat1 and Ibat2 of power storage units 4-1 and 4-2, respectively (step S02).

Next, with reference to the map for setting target SOC shown in FIG. 3, target value setting unit 202 sets the target state of charge SOC1* for the first power storage unit 4-1, based on battery temperature Tbat1. Further, target value setting unit 202 sets the target state of charge SOC2* for the second power storage unit 4-2, based on battery temperature Tbat2 (step S03).

Further, state estimating unit 204 estimates SOC of each of power storage units 4-1 and 4-2, based on battery temperatures Tbat1 and Tbat2, battery voltages Vbat1 and Vbat2, battery currents Ibat1 and Ibat2, and so on (step S04).

Next, converter control unit 210 determines the ratio of charging current to each power storage unit, based on the tolerable amount of charging of the power storage units, such that charging of every power storage unit ends substantially simultaneously (step S05).

Battery temperature predicting unit 222 calculates predicted battery temperature Tbat(P) at the time of completion of external charging by the method described above, based on the charging current, battery temperature Tbat and intake air temperature Tc, for each of the power storage units 4-1 and 4-2 (step S051). Target value correcting unit 220 corrects the target state of charge SOC* set at step S03 in accordance with the predicted battery temperature Tbat(P) calculated at step S051 (step S052), and outputs the corrected target state of charge SOC*(R) to converter control unit 210.

Converter control unit 210 starts charging of power storage units by the external power source, such that SOC of each of power storage units 4-1 and 4-2 attains to the target state of charge SOC*(R). At this time, converter control unit 210 controls the voltage converting operations of converters 6-1 and 6-2 in accordance with the current ratio determined at step S05 (step S06).

Further, converter control unit 210 determines whether external charging of each power storage unit has been completed, based on the SOC successively calculated at state estimating unit 204. Specifically, converter control unit 210 determines whether the SOC of each power storage unit matches the target state of charge SOC*(R) (step S071). If the SOC of any of the power storage units does not match the target state of charge SOC*(R) (NO at step S071), that is, if external charging of the power storage unit has not yet been completed, the process returns to step S02.

On the contrary, if the SOC of every power storage unit has reached the target state of charge SOC*(R) (YES at step S071), that is, if external charging of all power storage units has been completed, the process related to the external charging operation ends.

As described above, according to Embodiment 2 of the present invention, target state of charge for the power storage unit is set in consideration of degree of increase of battery temperature during execution of external charging and, therefore, degradation of power storage unit can more reliably be reduced.

Embodiment 3

In Embodiment 2 above, a configuration has been described in which the target state of charge is set in accordance with the expected battery temperature at the time of completion of external charging. By such a configuration, degradation of power storage unit can more effectively be reduced as compared with the configuration in which the power storage unit is uniformly charged to the fully charged state.

On the other hand, it follows that when the external charging is completed, the vehicle is left unused with the power storage unit having high SOC, until the vehicle next enters the IG on state. In this period, degradation proceeds. This is apparent from the degradation characteristic of power storage unit (FIG. 3) and, particularly when it is left unused with high battery temperature, accelerated degradation of power storage unit is expected.

Therefore, in Embodiment 3 below, a configuration will be described in which the target state of charge is set in consideration of the degree of degradation of power storage unit after completion of external charging.

Figure 7:
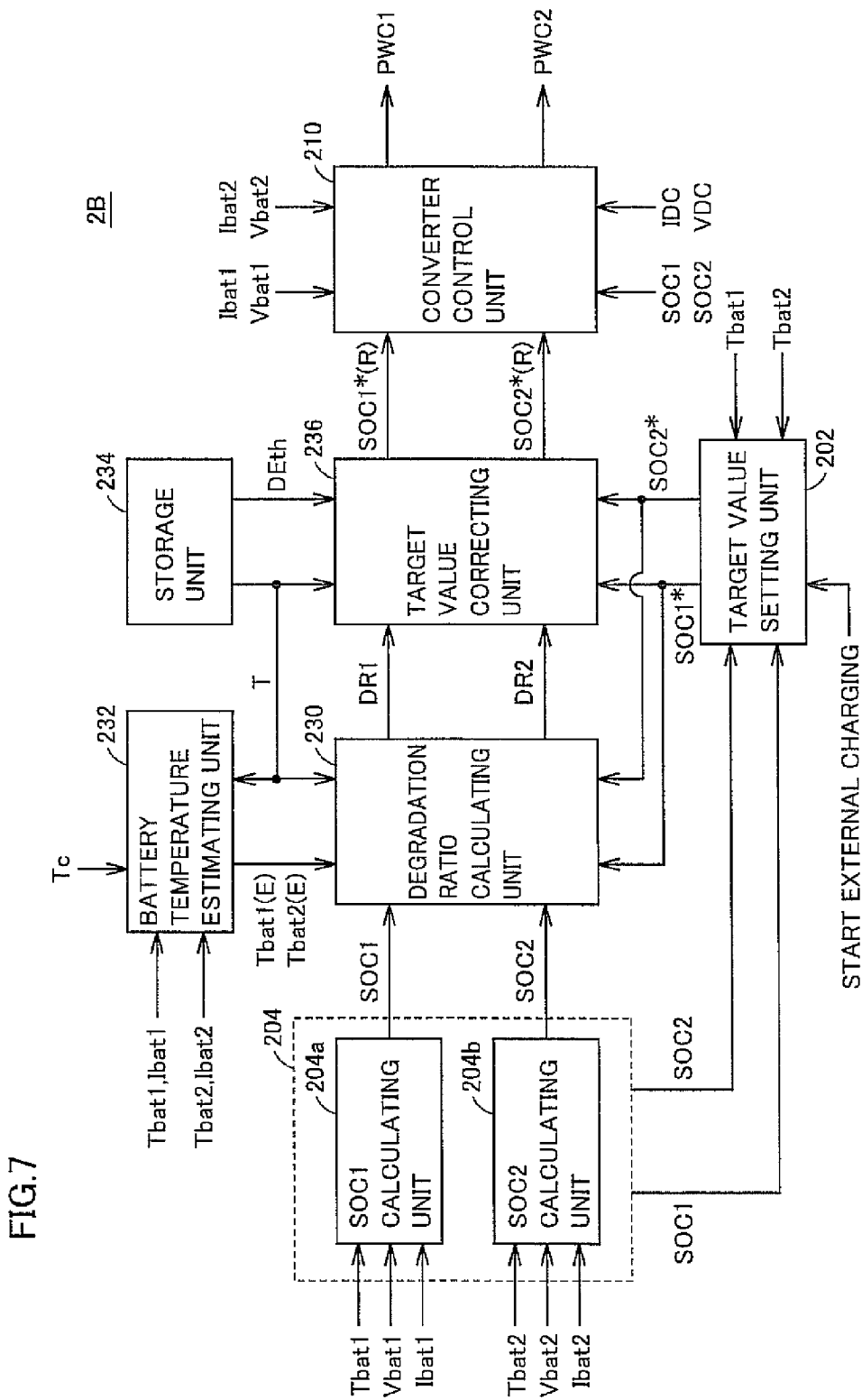
FIG. 7 is a block diagram showing a control structure of a controller 2B in accordance with Embodiment 3 of the present invention.

FIG. 7 is a block diagram showing a control structure of a controller 2B in accordance with Embodiment 3 of the present invention. Each of the functional blocks shown in FIG. 7 is realized typically by controller 2B executing a program stored in advance. It is possible, however, to implement part of or all of the functions by hardware.

Referring to FIG. 7, controller 2B is equivalent to controller 2 in accordance with Embodiment 1 shown in FIG. 2, additionally having a degradation ratio calculating unit 230, a battery temperature estimating unit 232, a target value correcting unit 236 and a storage unit 234. Other portions of controller 2B are already described and, therefore, detailed description thereof will not be repeated.

Battery temperature estimating unit 232 estimates temporal change of battery temperatures Tbat1 and Tbat2 in the time period necessary from the start of external charging until the vehicle enters the IG on state (hereinafter also referred to as "required time period") T, for each of the power storage units. Specifically, battery temperature estimating unit 232 estimates temporal change of battery temperature Tbat while external charging is executed, and estimates temporal change of battery temperature in a period after the completion of external charging until the vehicle enters the IG on state (hereinafter also referred to as "unused time period") Tm.

Specifically, as to the temporal change of battery temperature Tbat while the external charging is executed, battery temperature estimating unit 232 first calculates the charge completion period Tch in accordance with Equation (1), based on a difference between the target state of charge SOC* from target value setting unit 202 and the SOC from state estimating unit 204. Then, battery temperature estimating unit 232 calculates amount of heat generation and amount of heat radiation per unit time in accordance with the method described with reference to Embodiment 2 for each of power storage units 4-1 and 4-2, and estimates temporal change of battery temperature Tbat in charge completion period Tch based on the difference between the two.

Further, as to the temporal change of battery temperature Tbat in the unused time period Tm, battery temperature estimating unit 232 calculates the period by subtracting the charge completion time period Tch from required time period T as unused time period Tm (=T−Tch), and integrates the amount of heat radiation per unit time for the unused time period Tm, to estimate temporal change of battery temperature Tbat.

Here, as to the required time period T from the start of external charging until the vehicle enters the IG on state, a learned value stored in advance in storage unit 234 is read. The learned value is obtained by learning daily pattern of vehicle use by the user. By way of example, if the vehicle is used in such a pattern that the power storage unit is externally charged at night when the vehicle is not used and the user uses the vehicle at a prescribed time in the morning, the learned value of required time period T is the period from the start of external charging at night until the prescribed time the next morning when the vehicle is used. As to the manner of obtaining required time period T, the learned value may be read from storage unit 234, or a value may be input by the user operating an operating unit, not shown.

Degradation ratio calculating unit 230 receives an estimated battery temperature Tbat(E) as a result of estimation of temporal change in battery temperature Tbat from battery temperature estimating unit 232, receives SOC of each of power storage units 4-1 and 4-2 from state estimating unit 204, and receives target state of charge SOC* of each of power storage units 4-1 and 4-2 from target value setting unit 202, and based on these pieces of input information, calculates the temporal change of degradation ratio DR per unit time of the power storage unit in the required time period T.

Specifically, degradation ratio calculating unit 230 successively calculates degradation ratio DR1 per unit time, with reference to the degradation characteristics of power storage unit shown in FIG. 3 in connection with the temporal change of battery temperature Tbat1 and temporal change of SOC1, for the first power storage unit 4-1. Further, degradation ratio calculating unit 230 successively calculates degradation ratio DR2 per unit time, with reference to the degradation characteristics of power storage unit shown in FIG. 3 in connection with the temporal change of battery temperature Tbat2 and temporal change of SOC2, for the second power storage unit 4-2.

Receiving the degradation ratios DR1 and DR2 per unit time of power storage units 4-1 and 4-2, respectively, from degradation ratio calculating unit 230, target value correcting unit 236 integrates degradation ratios DR1 and DR2 for the required time period T, to calculate the amounts of degradation DE1 and DE2 of power storage units 4-1 and 4-2 over the required time period T, respectively. Then, target value correcting unit 236 corrects the target states of charge SOC1* and SOC2* of respective power storage units in accordance with the corresponding amounts of degradation DE1 and DE2, respectively.

Specifically, target value correcting unit 236 reads a tolerable amount of degradation DEth as the amount of degradation tolerable per one charging operation, from the degradation characteristics of the power storage unit stored in storage unit 234. Then, for each of power storage units 4-1 and 4-2, target value correcting unit 236 compares the magnitude of calculated amount of degradation DE and the tolerable amount of degradation DEth, and if the amount of degradation DE exceeds the tolerable amount of degradation DEth, it gradually decreases the target state of charge SOC* by a prescribed value ΔSOC. On the contrary, if the amount of degradation DE is below the tolerable amount of degradation DEth, it gradually increases the target state of charge SOC* by the prescribed value ΔSOC. Such decrease or increase of target state of charge SOC* is continuously performed until the amount of degradation DE becomes equal to the tolerable amount of degradation DEth.

Figure 8:
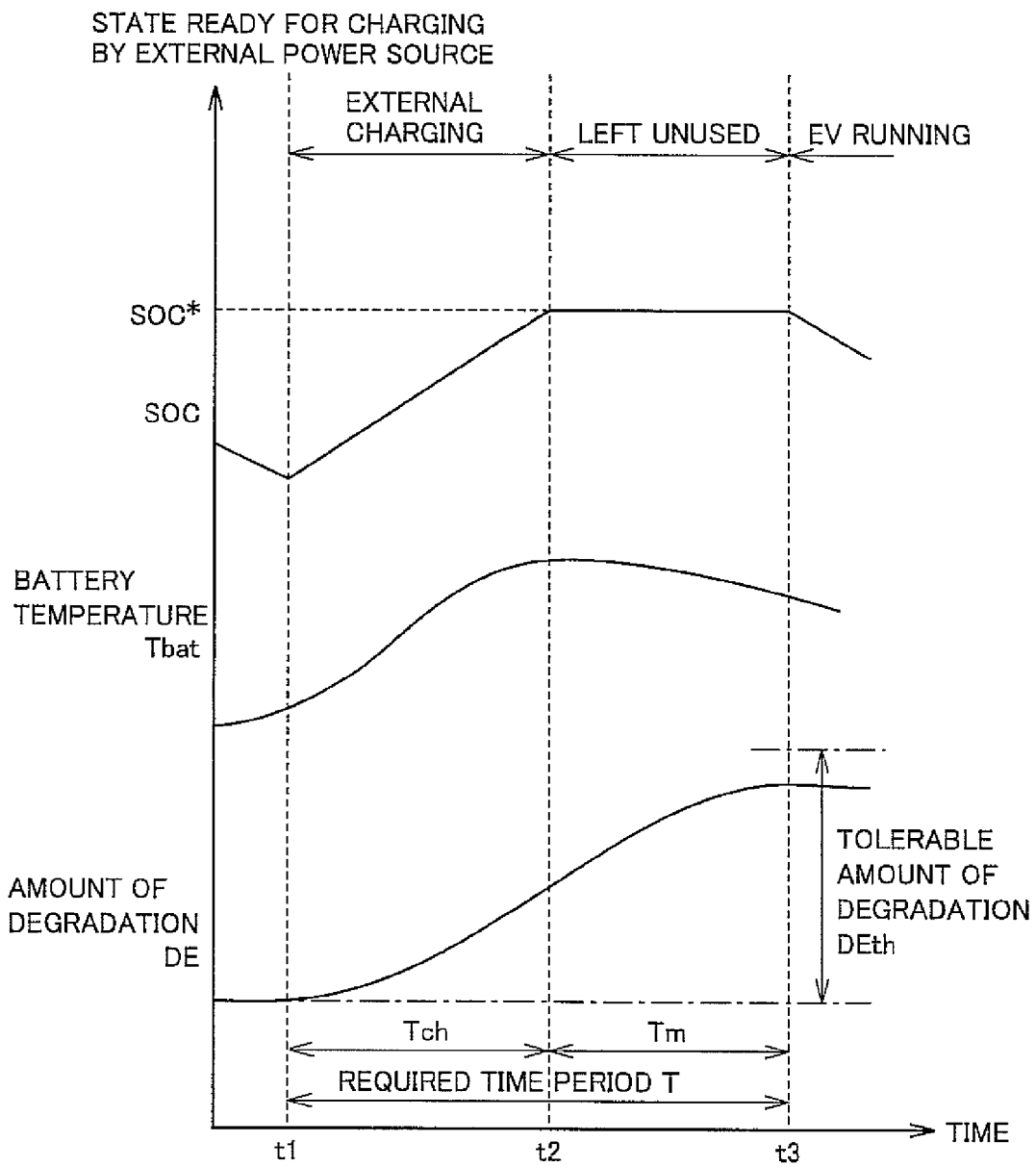
FIG. 8 shows exemplary changes with time of SOC of power storage unit, battery temperature and amount of degradation in a required time period T.

FIG. 8 shows an example of temporal change in SOC of power storage unit, battery temperature Tbat and amount of degradation DE in the required time period T.

Referring to FIG. 8, first, assume that a state ready for charging by the external power source is attained at time point t1. After time point t1, SOC of the power storage unit increases as external charging of the power storage unit starts. Further, by reaction heat and self-heat generation of internal resistance during charging, battery temperature Tbat increases. Thus, the degradation ratio DR per unit time of power storage unit increases in accordance with the degradation characteristics shown in FIG. 3. Therefore, the amount of degradation DE obtained by integrating the degradation ratio DR per unit time for the elapsed time period from t1 also increases.

Then, when external charging completes at time point t2 in response to SOC reaching the target state of charge SOC*, it follows that the power storage unit is left in a state of high SOC. Therefore, in the unused time period Tm, the amount of degradation DE increases due to the increase of degradation ratio DR.

In contrast, controller 2B in accordance with the present embodiment defines in advance the required time period T from time point t1 until a time point t3 at which the vehicle enters the IG on state based on the learned value, estimates the temporal change of internal state (SOC, battery temperature and the like) of the power storage unit in required time period T, and based on the result of estimation, calculates the amount of degradation DE of power storage unit in required time period T. Then, controller 2B corrects the target state of charge SOC* such that the calculated amount of degradation DE does not exceed tolerable amount of degradation DEth.

As described above, controller 2B in accordance with the present embodiment can reliably reduce degradation of the power storage unit by setting target state of charge SOC* of the power storage unit additionally in consideration of the degree of degradation of power storage unit in the unused time period after completion of external charging.

Figure 9:
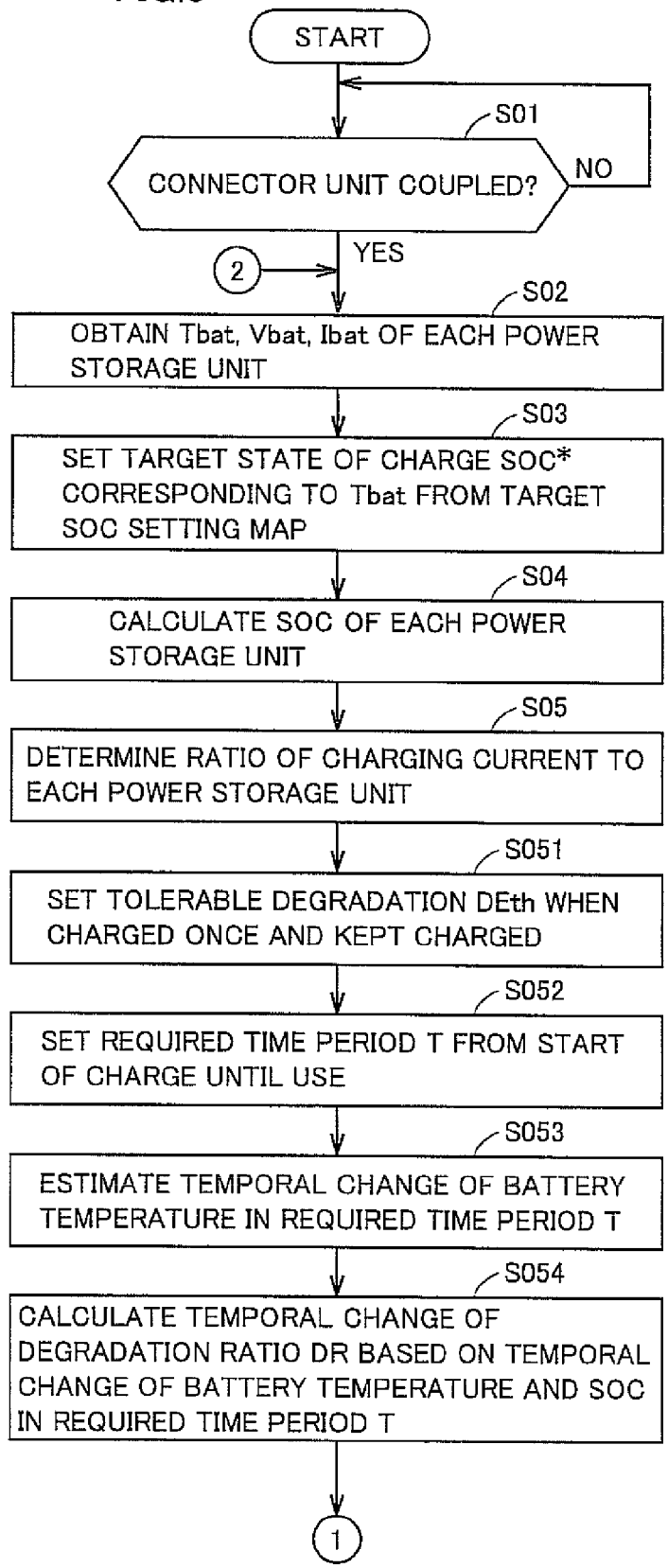
FIG. 9 is a flowchart representing process steps of an external charging operation in accordance with Embodiment 3 of the present invention.
Figure 10:
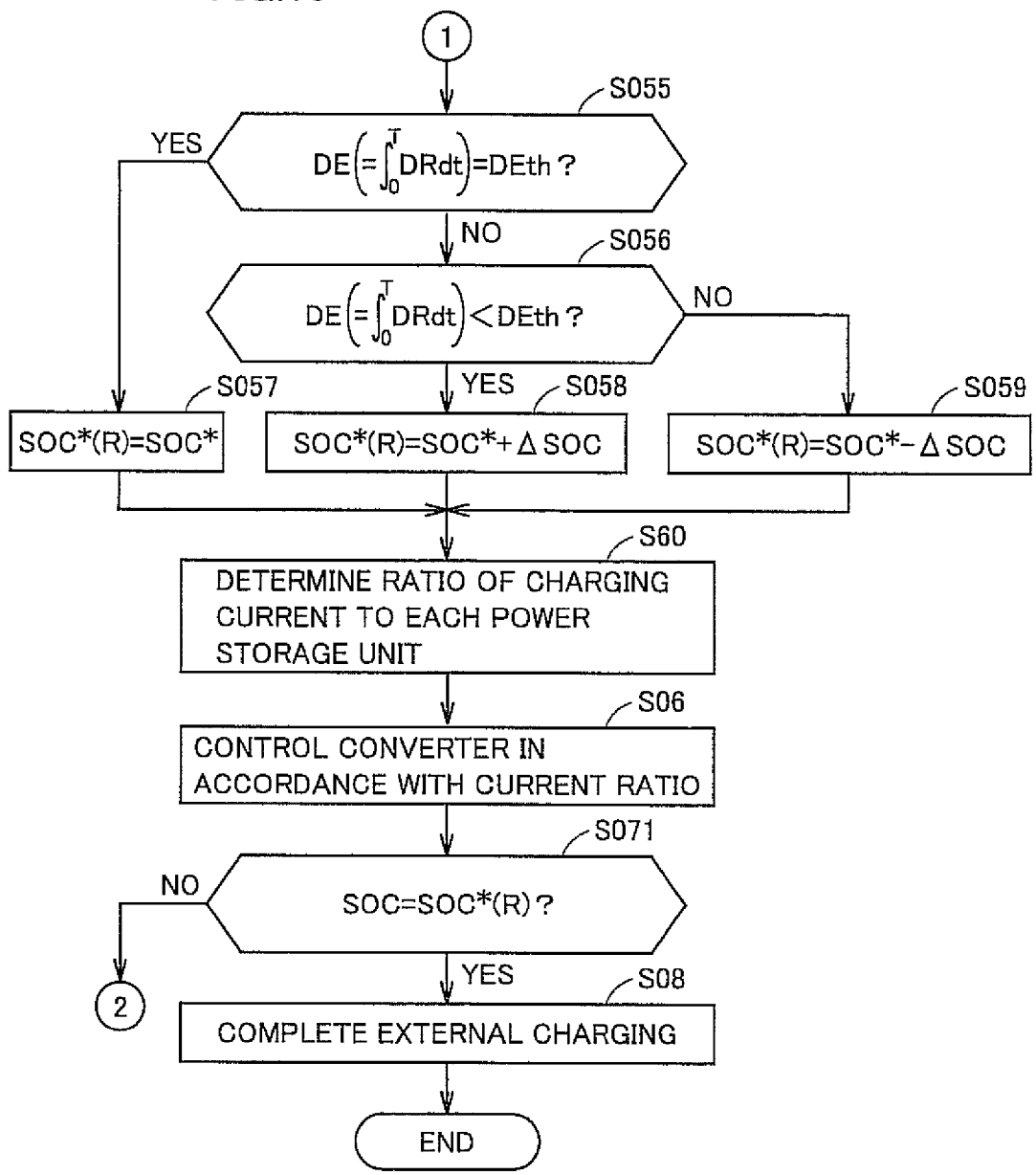
FIG. 10 is a flowchart representing process steps of the external charging operation in accordance with Embodiment 3 of the present invention.

The process described above can be summarized by the process flow shown in FIGS. 9 and 10.

FIGS. 9 and 10 are flowcharts representing process steps of external charging operation in accordance with Embodiment 3 of the present invention. The process of each of the steps shown in FIGS. 9 and 10 can be realized by controller 2B functioning as each control block shown in FIG. 7.

Referring to FIG. 9, based on an external charging start signal derived from a coupling signal CON from coupling detection sensor 150a (FIG. 1), target value setting unit 202 determines whether or not connector unit 530 is coupled to vehicle 100 (step S01).

If connector unit 350 is not coupled to vehicle 100 (NO at step S01), the process returns to the start.

On the contrary, if connector unit 350 is coupled to vehicle 100 (YES at step S01), target value setting unit 202 determines that the state ready for charging by the external power source has been attained, and obtains battery temperatures Tbat1 and Tbat2 of power storage unit 4-1 and 4-2, respectively, from temperatures sensors 11-1 and 11-2 (FIG. 1), respectively. Further, state estimating unit 204 obtains battery temperatures Tbat1 and Tbat2, battery voltages Vbat1 and Vbat2 and battery currents Ibat1 and Ibat2 of power storage units 4-1 and 4-2, respectively (step S02).

Next, target value setting unit 202 sets target state of charge SOC1* for the first power storage unit 4-1, based on battery temperature Tbat1, with reference to the map for setting target SOC shown in FIG. 3. Further, target value setting unit 202 sets target state of charge SOC2* for the second power storage unit 4-2, based on battery temperature Tbat2 (step S03).

Then, state estimating unit 204 estimates SOC of each of power storage units 4-1 and 4-2 based on battery temperatures Tbat1 and Tbat2, battery voltages Vbat1 and Vbat2, battery currents Ibat1 and Ibat2 and the like (step S04).

Next, battery temperature estimating unit 232 determines the ratio of charging current to each power storage unit based on the tolerable amount of charges of the power storage unit such that SOC of each of power storage units 4-1 and 4-2 attains substantially simultaneously to the target state of charge SOC* set at step S03 (step S05).

Target value correcting unit 236 reads the tolerable amount of degradation DEth from storage unit 234 (step S051). Then, battery temperature estimating unit 232, degradation ratio calculating unit 230 and target value correcting unit 236 read required time period T from the start of external charging until the vehicle enters the IG on state, from storage unit 234 (step S052).

Then, battery temperature estimating unit 232 estimates temporal change of battery temperature Tbat in required time period T, for each of power storage units 4-1 and 4-2, based on the target state of charge SOC*, SOC and charging current for each power storage unit obtained at steps S03 to S05 (step S053).

Further, degradation ratio calculating unit 230 calculates temporal change of degradation ratio DR per unit time of the power storage unit, with reference to the degradation characteristics of the power storage unit shown in FIG. 3, based on the estimated temporal change of battery temperature Tbat and temporal change of SOC of required time period T (step S054).

Next, target value correcting unit 236 integrates the calculated temporal change of degradation ratio DR for the required time period T, to calculate the amount of degradation DE of power storage unit over the required time period T. Then, based on the result of comparison between the calculated amount of degradation DE and the tolerable amount of degradation DEth, target value correcting unit 236 corrects the target state of charge SOC* set at step S03.

Specifically, target value correcting unit 236 first determines whether or not the amount of degradation DE is equal to the tolerable amount of degradation DEth (step S055). If the amount of degradation DE is equal to the tolerable amount of degradation DEth (YES at step S055), target value correcting unit 236 sets the target state of charge SOC* as it is to be the corrected target state of charge SOC*(R) (step S057).

If the amount of degradation DE is different from tolerable amount of degradation DEth (NO at step S055), target value correcting unit 236 determines whether the amount of degradation DE is below the tolerable amount of degradation DEth or not (step S056). If the amount of degradation DE is below the tolerable amount of degradation DEth (YES at step S056), target value correcting unit 236 sets a value obtained by increasing the target state of charge SOC* by a prescribed value ΔSOC to be the corrected target state of charge SOC*(R) (step S058).

On the contrary, if the amount of degradation DE exceeds the tolerable amount of degradation DEth (NO at step S056), target value correcting unit 236 sets a value obtained by decreasing target state of charge SOC* by the prescribed value ΔSOC to be the corrected target state of charge SOC*(R) (step S059).

Next, converter control unit 210 starts charging of the power storage units by the external power source such that SOC of each of power storage units 4-1 and 4-2 attains to the target state of charge SOC*(R) set through steps S057 to S059. At this time, converter control unit 210 determines the ratio of charging current for each power storage unit based on the tolerable amount of charges of the power storage unit such that charging of all power storage units are completed substantially at the same time (step S060), and controls voltage converting operations of converters 6-1 and 6-2 in accordance with the determined current ratio (step S06).

Further, converter control unit 210 determines whether external charging of each power storage unit has been completed, based on SOC successively calculated by state estimating unit 204. Specifically, converter control unit 210 determines whether the SOC of each power storage unit matches the target state of charge SOC*(R) or not (step S071). If SOC of any of the power storage units does not match the target state of charge SOC*(R) (NO at step S071), that is, if external charging of the power storage unit is not yet completed, the process returns to step S02.

If the SOC of every power storage unit matches the target state of charge SOC*(R) (YES at step S071), that is, if external charging of every power storage unit has been completed, the process related to external charging ends.

In this manner, controller 2B in accordance with Embodiment 3 enables setting of target state of charge SOC* considering not only the degree of degradation while the external charging is being executed but also the degree of degradation of the power storage unit while it is left unused after completion of external charging, using the learned value of vehicle usage pattern stored in storage unit 234. Thus, degradation of power storage unit can more reliably be reduced.

Further, by modifying controller 2B such that the external charging operation is controlled using the learned value of vehicle use pattern in a manner as represented by Modifications 1 and 2 below, it becomes possible to more effectively reduce degradation of power storage unit while it is left unused.

(Modification 1)

Figure 11:
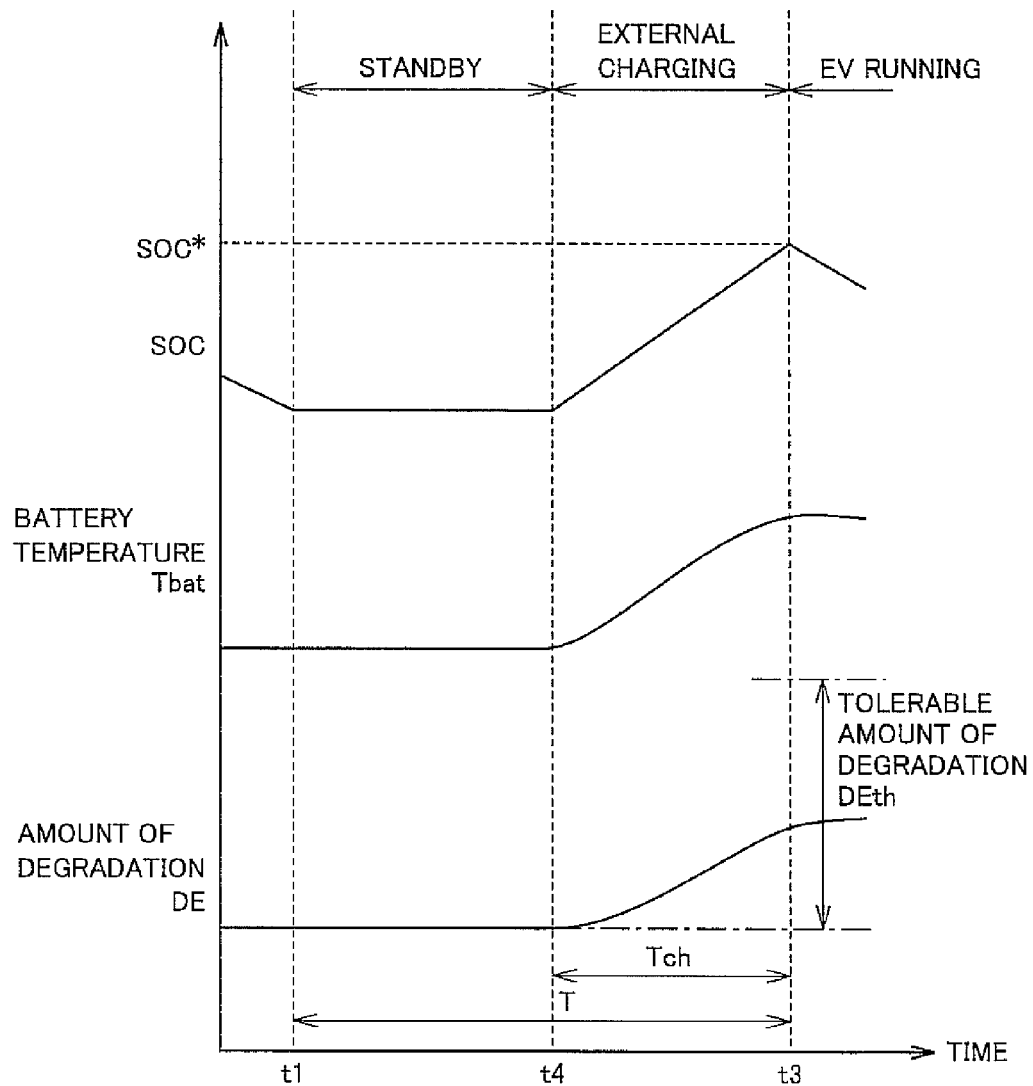
FIG. 11 shows a control structure for the external charging operation in accordance with a first modification of Embodiment 3 of the present invention.

FIG. 11 represents a control structure of the external charging operation in accordance with a first modification of Embodiment 3 of the present invention.

Referring to FIG. 11, in Modification 1, the start timing of external charging is not the time point t1 at which the state ready for charging by the external power source is attained but a time point t4 later than t1. The time point t4 is determined by going back the pre-calculated charge completion period Tch from time point t3 at which the vehicle enters the IG on state. Namely, in the time period from t1 to t4, external charging does not take place and power storage units 4-1 and 4-2 are kept in stand-by.

Specifically, converter control unit 210 reads the time point t3 at which the vehicle enters the IG on state from the vehicle use pattern stored in storage unit 234, and calculates the charge completion period Tch from the difference between SOC and target state of charge SOC* of the power storage unit. Then, converter control unit 210 sets the time point t4 preceding time point t3 by charge completion period Tch, as the external charging start time.

By such an arrangement, the unused time period becomes shorter and, therefore, the amount of degradation DE of power storage units 4-1 and 4-2 while the vehicle is stopped comes to correspond mainly to the amount of degradation during execution of external charging. As a result, degradation of power storage units 4-1 and 4-2 can more effectively be reduced.

(Modification 2)

Figure 12:
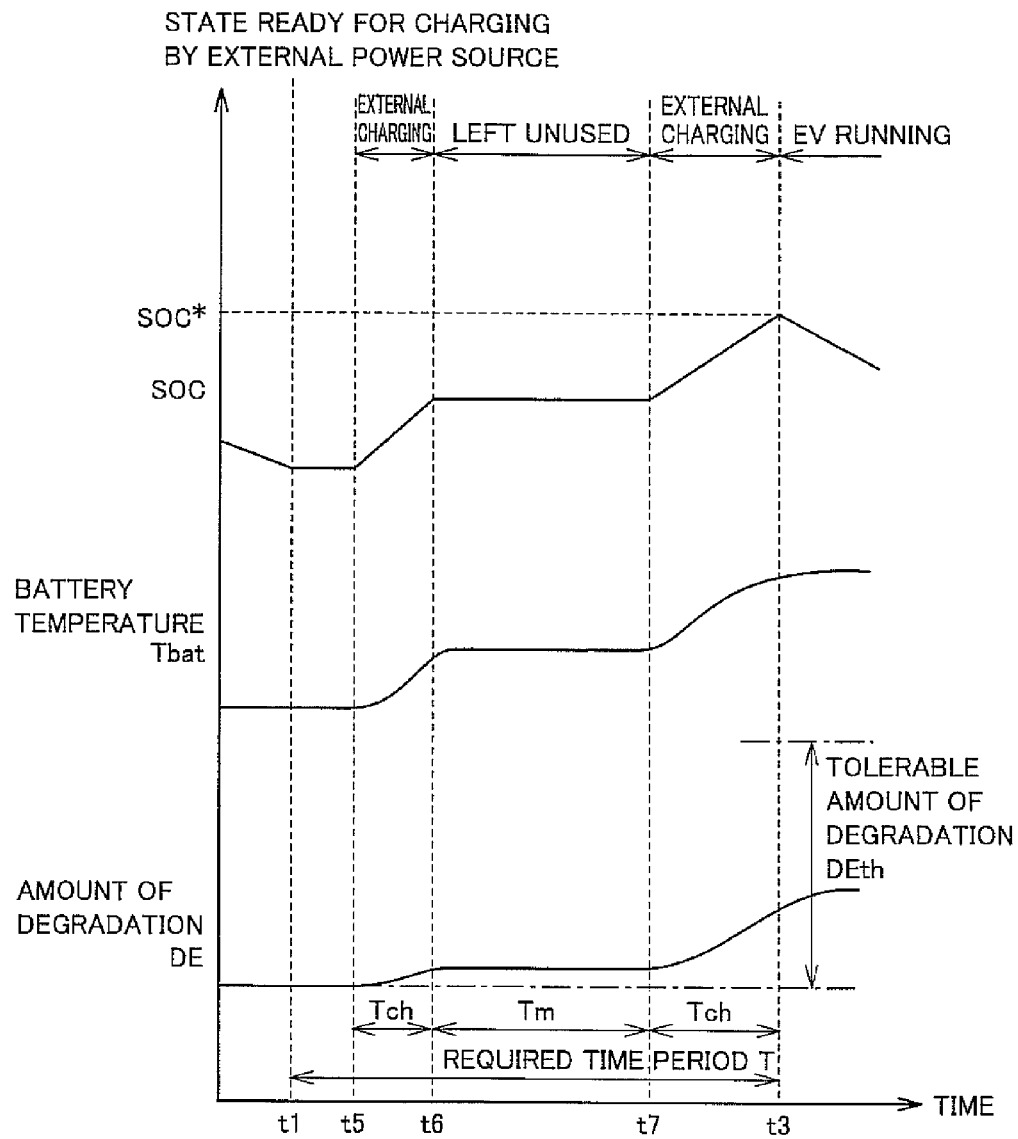
FIG. 12 shows a control structure for the external charging operation in accordance with a second modification of Embodiment 3 of the present invention.

FIG. 12 represents a control structure of the external charging operation in accordance with a second modification of Embodiment 3 of the present invention.

In Modification 1 above, external charging of power storage units 4-1 and 4-2 is not executed in the period from t1 to t4 and, therefore power storage units 4-1 and 4-2 are left stand-by in low-charged state. Therefore, in the period, degradation ratio DR is relatively low and hence, progress of degradation of power storage unit can be curbed. On the contrary, if the user should unexpectedly use the vehicle in this period, desired running performance would not be attained, as the power storage units are not sufficiently charged.

Therefore, in Modification 2, an approach is taken in which external charging is done in a number of stages. Specifically, a prescribed state of charge lower than the target state of charge SOC* is set as a first target state of charge, and when the state ready for charging by the external power source is attained at time point t1, external charging of power storage units 4-1 and 4-2 is executed until SOC attains to the first target state of charge. When SOC attains to the first target state of charge at t6, external charging is once stopped and power storage units 4-1 and 4-2 are left as they are. Then external charging is executed again from time point t7 preceding by the prescribed charge completion period Tch from time point t3, whereby SOC comes to be equal to the target state of charge SOC*.

By such an approach, it follows that while the vehicle is stopped, power storage units 4-1 and 4-2 are kept at the minimum SOC necessary to ensure vehicle running. The degradation ratio DR per unit time here is relatively lower than the degradation ratio DR in the high SOC state (FIG. 3) and, therefore, the amount of degradation DE of power storage units 4-1 and 4-2 is not much increased. As a result, it becomes possible to reduce degradation of power storage units 4-1 and 4-2 while ensuring running performance of the vehicle.

Embodiment 4

In Embodiment 3 above, the target state of charge by external charging is set in consideration of the degree of degradation in the unused time period after completion of external charging, so as to reduce degradation of power storage units.

In Embodiment 4 below, battery temperature during execution of external charging is controlled in consideration of the degree of degradation in the unused time period after completion of external charging. This prevents increase in battery temperature associated with external charging and, therefore, different from Embodiment 3 above, correction of target state of charge becomes unnecessary. As a result, it becomes possible to prevent progress of degradation of power storage unit while state of charge of the power storage unit can be increased.

Figure 13:
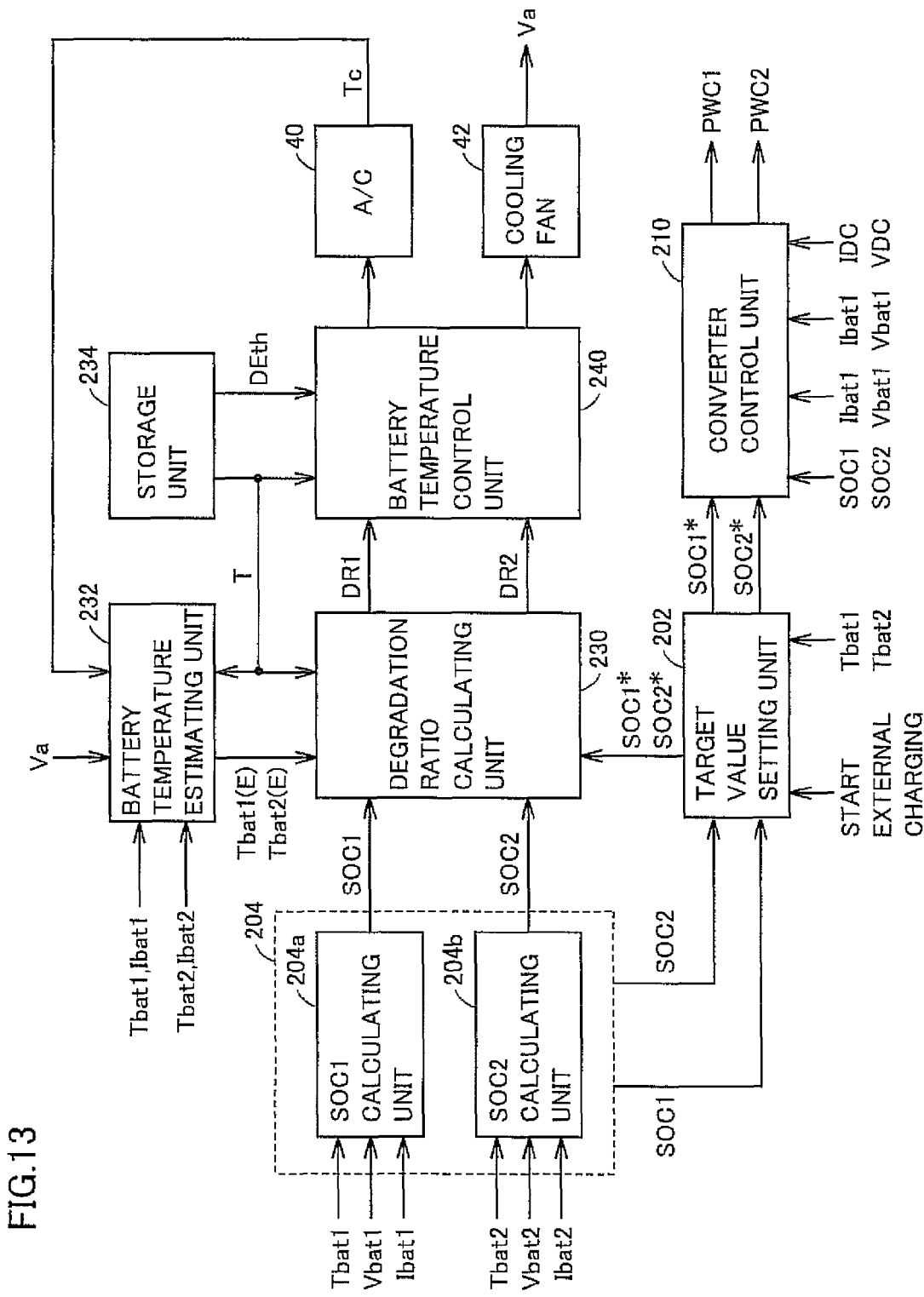
FIG. 13 is a block diagram showing a control structure of a controller 2C in accordance with Embodiment 4 of the present invention.

FIG. 13 is a block diagram showing a control structure of a controller 2C in accordance with Embodiment 4 of the present invention. Each of the functional blocks shown in FIG. 13 is realized typically by controller 2C executing a program stored in advance. It is possible, however, to implement part of or all of the functions by hardware.

Referring to FIG. 13, controller 2C is equivalent to controller 2 in accordance with Embodiment 1 shown in FIG. 2, additionally including degradation ratio calculating unit 230, battery temperature estimating unit 232, battery temperature control unit 240 and storage unit 234. Other portions of controller 2C have been described above and, therefore, detailed description will not be repeated.

Battery temperature estimating unit 232 estimates temporal change of battery temperatures Tbat1 and Tbat2 in required time period T from the start of external charging until the vehicle enters the IG on state, for respective power storage units. The temporal change of battery temperature is estimated by the same method as described in connection with Embodiment 3 above. Specifically, battery temperature estimating unit 232 reads the learned value stored in advance in storage unit 234 as the required time period T, and estimates the change with time of battery temperature Tbat in the charge complete time Tch and the unused time period Tm (=T−Tch) from the completion of external charging until the vehicle enters the IG on state.

Degradation ratio calculating unit 230 receives the estimated battery temperature Tbat(E) as the result of estimation of temporal change of battery temperature Tbat from battery temperature estimating unit 232, receives SOC of each of power storage units 4-1 and 4-2 from state estimating unit 204, and receives target state of charge SOC* of each of power storage units 4-1 and 4-2 from target value setting unit 202, and calculates temporal change of degradation ratio per unit time of the power storage unit in required time period T, based on these pieces of input information.

Specifically, degradation ratio calculating unit 230 successively calculates degradation ratio DR1 per unit time, with reference to the degradation characteristics of power storage unit shown in FIG. 3 in connection with the temporal change of battery temperature Tbat1 and temporal change of SOC1, for the first power storage unit 4-1. Further, degradation ratio calculating unit 230 successively calculates degradation ratio DR2 per unit time, with reference to the degradation characteristics of power storage unit shown in FIG. 3 in connection with the temporal change of battery temperature Tbat2 and temporal change of SOC2, for the second power storage unit 4-2.

Battery temperature control unit 240 receives degradation ratios DR1 and DR2 per unit time of power storage units 4-1 and 4-2, respectively, from degradation ratio calculating unit 230, and integrates the degradation ratios DR1 and DR2 for the required time period T, to calculate the amount of degradation DE of each of power storage units 4-1 and 4-2 over the required time period T. Then, battery temperature control unit 240 reads the tolerable amount of degradation DEth stored in storage unit 234, and compares magnitudes of calculated amount of degradation DE and the tolerable amount of degradation DEth. Here, if the amount of degradation DE exceeds the tolerable amount of degradation DEth, battery temperature control unit 240 activates an air conditioner (A/C) 40. As a result, a temperature (intake air temperature) Tc of the air in the compartment conditioned by air conditioner 40 is input to battery temperature estimating unit 232. Further, power stored in power storage units 4-1 and 4-2 is consumed by air conditioner 40 and, therefore, SOC of each power storage unit decreases.

Further, battery temperature control unit 240 increases amount Va of cooling medium supplied by a cooling fan 42 provided in a cooling mechanism. Thus, the increased amount of supply Va of cooling medium is input to battery temperature estimating unit 232.

In this manner, if the amount of degradation DE of power storage unit over the required time period T exceeds the tolerable amount of degradation DEth, controller 2C in accordance with the present embodiment controls driving of air conditioner 40 and cooling fan 42 such that battery temperature Tbat decreases. In such a situation, driving of either one of these may be controlled.

Then, battery temperature estimating unit 232 again executes estimation of temporal change in battery temperature Tbat based on the input intake air temperature Tc and supplied amount Va of cooling medium. Degradation ratio calculating unit 230 calculates temporal change of degradation ratio DR of power storage unit in the required time period T, based on the estimated battery temperature Tbat(E) from battery temperature estimating unit 232. Further, based on the calculated temporal change of degradation ratio DR, battery temperature control unit 240 calculates the amount of degradation DE in required time period T. Then, battery temperature control unit 240 again compares magnitudes of calculated amount of degradation DE and tolerable amount of degradation DEth, an if the amount of degradation DE is equal to or smaller than tolerable amount of degradation DEth, it stops operation of air conditioner 40. Further, it reduces the amount Va of cooling medium supplied by cooling fan 42.

In this manner, controller 2C in accordance with the present embodiment controls battery temperature Tbat while the external charging is being executed such that the amount of degradation DE in the required time period T does not exceed the tolerable amount of degradation DEth and, therefore, it becomes possible to increase the state of charge of power storage unit while reducing the degradation of power storage unit.

Figure 14:
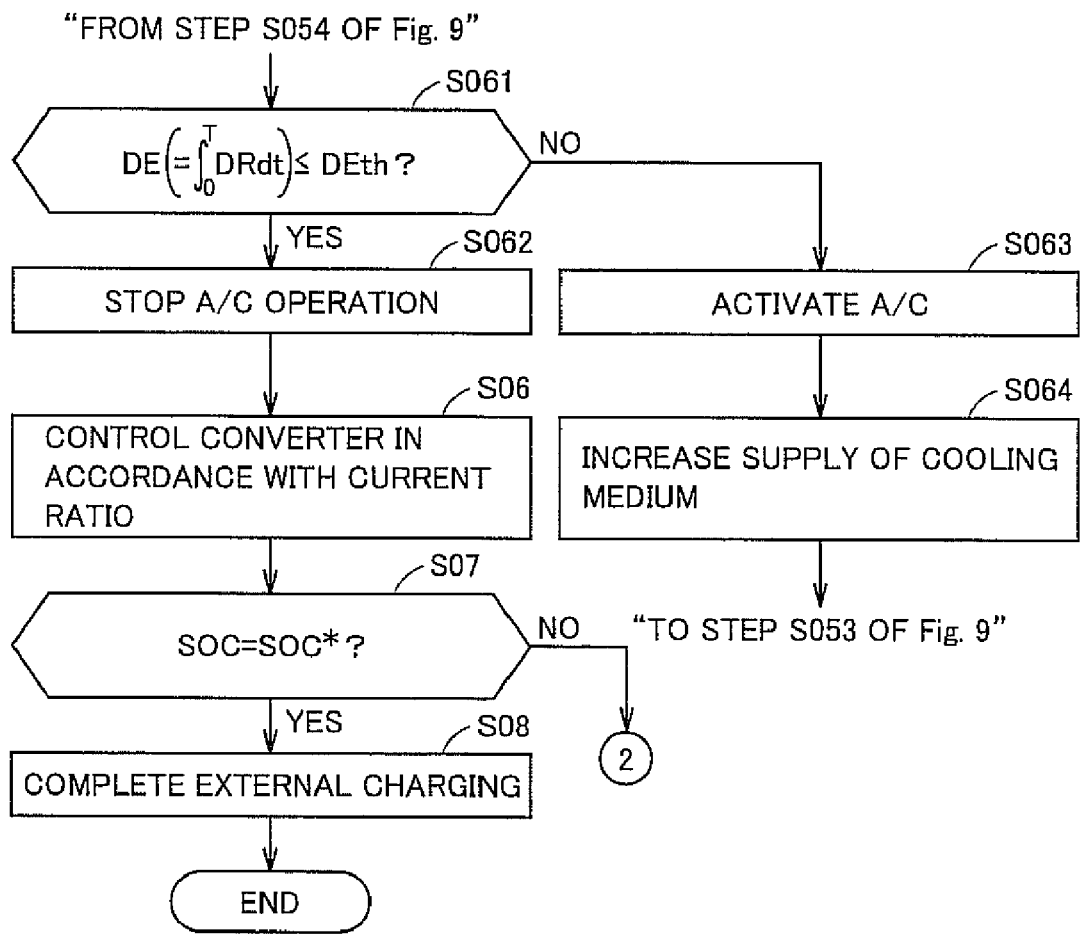
FIG. 14 is a flowchart representing process steps of an external charging operation in accordance with Embodiment 4 of the present invention.

The process described above can be summarized by the process flow shown in FIG. 14.

FIG. 14 is a flowchart representing the process steps of external charging operation in accordance with Embodiment 4 of the present invention. The processes of steps shown in FIG. 14 correspond to those of process flow shown in FIGS. 9 and 10 with steps S055 to S060 of FIG. 10 replaced by steps S061 to S065. Therefore, description of common steps S01 to S054 will not be repeated. Further, the process of each of the steps shown in FIGS. 9 and 14 can be realized by controller 2C functioning as each control block shown in FIG. 13.

Referring to FIG. 14, receiving temporal change of degradation ratio DR of each of power storage units 4-1 and 4-2 over the required time period T from degradation ratio calculating unit 230 (step S054), battery temperature control unit 240 integrates the degradation ratio DR for the required time period T, to calculate the amount of degradation DE of each power storage unit over the required time period T. Then, battery temperature calculating unit 240 determines whether the calculated amount of degradation DE is equal to or smaller than the tolerable amount of degradation DEth (step S061).

If the calculated amount of degradation DE exceeds the tolerable amount of degradation DEth (NO at step S061), battery temperature control unit 240 activates air conditioner 40 (step S063), and increases the amount Va of cooling medium supplied by cooling fan 42 (step S064). Then, the process returns to step S053 of FIG. 9, and estimation of temporal change in battery temperature Tbat is again executed.

On the contrary, if the amount of degradation DE is equal to or smaller than tolerable amount of degradation DEth (YES at step S061), battery temperature control unit 240 stops operation of air conditioner 40 (step S062). Further, it reduces the amount Va of cooling medium supplied by cooling fan 42.

Converter control unit 210 starts charging of power storage units by the external power source, such that SOC of each of power storage units 4-1 and 4-2 attains the target state of charge SOC*. At this time, converter control unit 210 controls the voltage converting operations of converters 6-1 and 6-2 in accordance with the current ratio determined at step S05 (FIG. 9) such that charging of all power storage units completes substantially at the same time (step S06).

Further, converter control unit 210 determines whether external charging of each power storage unit has been completed, based on the SOC successively calculated at state estimating unit 204. Specifically, converter control unit 210 determines whether the SOC of each power storage unit matches the target state of charge SOC* (step S07). If the SOC of any of the power storage units does not match the target state of charge SOC* (NO at step S07), that is, if external charging of the power storage unit has not yet been completed, the process returns to step S02.

On the contrary, if the SOC of every power storage unit has reached the target state of charge SOC* (YES at step S07), that is, if external charging of all power storage units has been completed, the process related to the external charging operation ends.

As described above, according to Embodiment 4 of the present invention, battery temperature during execution of external charging is controlled in consideration of degree of degradation of the power storage unit in the unused time period after completion of external charging. Therefore, the state of charge of power storage unit can be increased while reducing the degradation of power storage unit.

Embodiment 5

As described with reference to Embodiments 3 and 4 above, by controlling target state of charge or battery temperature during execution of external charging in consideration of the degree of degradation of power storage unit while it is left unused after completion of external charging, degradation of power storage unit can reliably be reduced.

Meanwhile, even when the control structure describe above is adopted, degradation of power storage unit may not be prevented when, for example, the vehicle is parked in the scorching heat in summer, since the battery temperature abruptly increases while the vehicle is left unused.

In Embodiment 5 below, a structure for controlling battery temperature after completion of external charging that can cope with abrupt change in degree of degradation while the vehicle is left unused will be described. It is assumed that the battery temperature control structure in accordance with the present embodiment is realized by controller 2C shown in FIG. 13.

Figure 15:
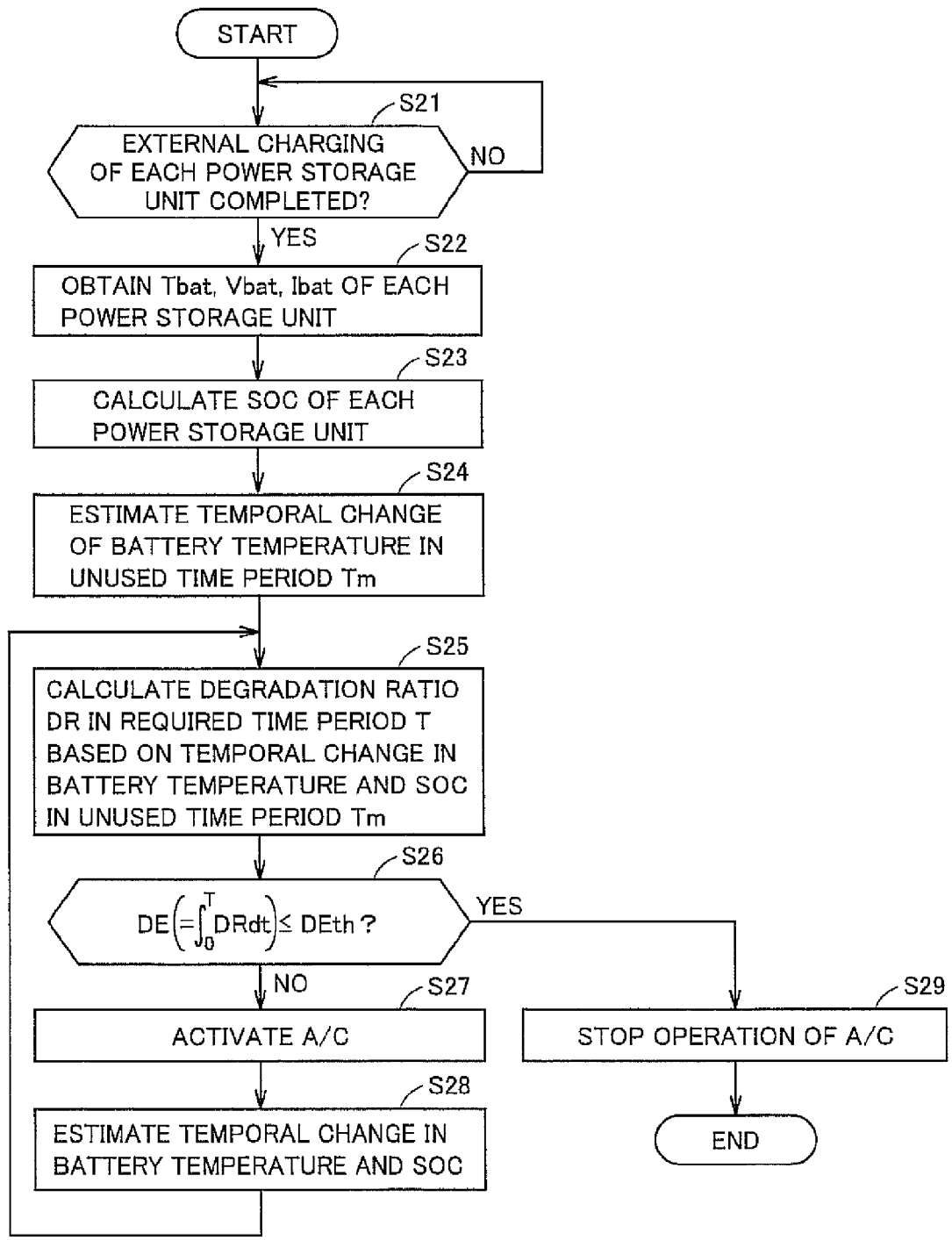
FIG. 15 is a flowchart representing a battery temperature control structure in accordance with Embodiment 5 of the present invention.

FIG. 15 is a flowchart representing the battery temperature control structure in accordance with Embodiment 5 of the present invention. The process of each of the steps shown in FIG. 15 can be realized by controller 2C functioning as each control block shown in FIG. 13.

Referring to FIG. 15, converter control unit 210 determines whether external charging of each power storage unit has been completed, based on SOC successively calculated by state estimating unit 204 (step S21). It external charging of any of the power storage units has not been completed (NO at step S21), the process returns to the start.

In contrast, if external charging of all power storage units has been completed (YES at step S21), converter control unit 210 stops voltage converting operations of converters 6-1 and 6-2. Battery temperature estimating unit 232 obtains from temperature sensors 11-1 and 11-2 (FIG. 1), battery temperatures Tbat1 and Tbat2 of power storage units 4-1 and 4-2, respectively. Further, state estimating unit 204 obtains battery temperatures Tbat1 and Tbat2, battery voltages Vbat1 and Vbat2, and battery currents Ibat1 and Ibat2 of power storage units 4-1 and 4-2, respectively (step S22).

State estimating unit 204 estimates SOC of each of power storage units 4-1 and 4-2, based on battery temperatures Tbat1 and Tbat2, battery voltages Vbat1 and Vbat2, battery currents Ibat1 and Ibat2, and so on (step S23).

Battery temperature estimating unit 232 estimates, based on battery temperatures Tbat1 and Tbat2, intake air temperature Tc and supply amount Va of cooling medium, temporal change of battery temperature Tbat in the period (unused time period) Tm from completion of external charging until the vehicle enters the IG on state, in accordance with the method described above (step S24).

Based on the temporal change of battery temperature Tbat and SOC in the unused time period Tm and temporal change of battery temperature Tbat and SOC in the charge completion time period Tch, degradation ratio calculating unit 230 calculates temporal change of degradation ratio DR per unit time in the required time period T from the start of external charging until the vehicle enters the IG on state (step S25).

Then, battery temperature control unit 240 integrates the temporal change of calculated degradation ratio DR for the required time period T, to calculate the amount of degradation DE for each of power storage units 4-1 and 4-2 over the required time period T. Thereafter, based on the result of comparison of magnitudes between calculated amount of degradation DE and tolerable amount of degradation DEth, battery temperature control unit 240 executes control of battery temperature Tbat.

Specifically, battery temperature control unit 240 determines whether the amount of degradation DE is equal to or smaller than the tolerable amount of degradation DEth (step S26). If the amount of degradation DE exceeds the tolerable amount of degradation DEth (NO at step S26), battery temperature control unit 240 activates air conditioner 40 (step S27). Further, battery temperature control unit 240 increases the amount Va of cooling medium supplied by cooling fan 42 (FIG. 13). In such a situation, battery temperature control unit 240 may control driving of either one of air conditioner 40 and cooling fan 42.

Here, air conditioner 40 is an auxiliary load that operates receiving electric power from the power supply system. Therefore, when air conditioner 40 is activated at step S26, electric power stored in power storage units 4-1 and 4-2 is consumed and SOC decreases. In other words, control of battery temperature Tbat leads to SOC control.

In parallel with control of battery temperature Tbat, battery temperature estimating unit 232 again executes estimation of temporal change in battery temperature Tbat and SOC of each of power storage units 4-1 and 4-2 (step S28). Then, the process returns to step S25.

In contrast, if the amount of degradation DE is equal to or smaller than tolerable amount of degradation DEth (YES at step S26), battery temperature control unit 240 stops operation of air conditioner 40 (step S29). Further, battery temperature control unit 240 reduces the amount Va of cooling medium supplied by cooling fan 42 (FIG. 13). Thus, process related to battery temperature control ends.

As described above, according to Embodiment 5 of the present invention, the amount of degradation of power storage unit in the required time period T until the vehicle enters the IG on state is estimated based on the detected battery temperature in the unused period after completion of external charging. At least one of battery temperature and SOC is controlled such that the estimated amount of degradation does not exceed the tolerable amount of degradation. Thus, even when battery temperature abruptly increases while the vehicle is left unused, degradation of power storage unit can reliably be reduced.

Embodiment 6

In Embodiment 6 of the present invention below, a configuration will be described in which SOC of power storage unit is controlled after completion of external charging, to cope with abrupt change in degradation ratio while the vehicle is left unused after completion of external charging.

Figure 16:
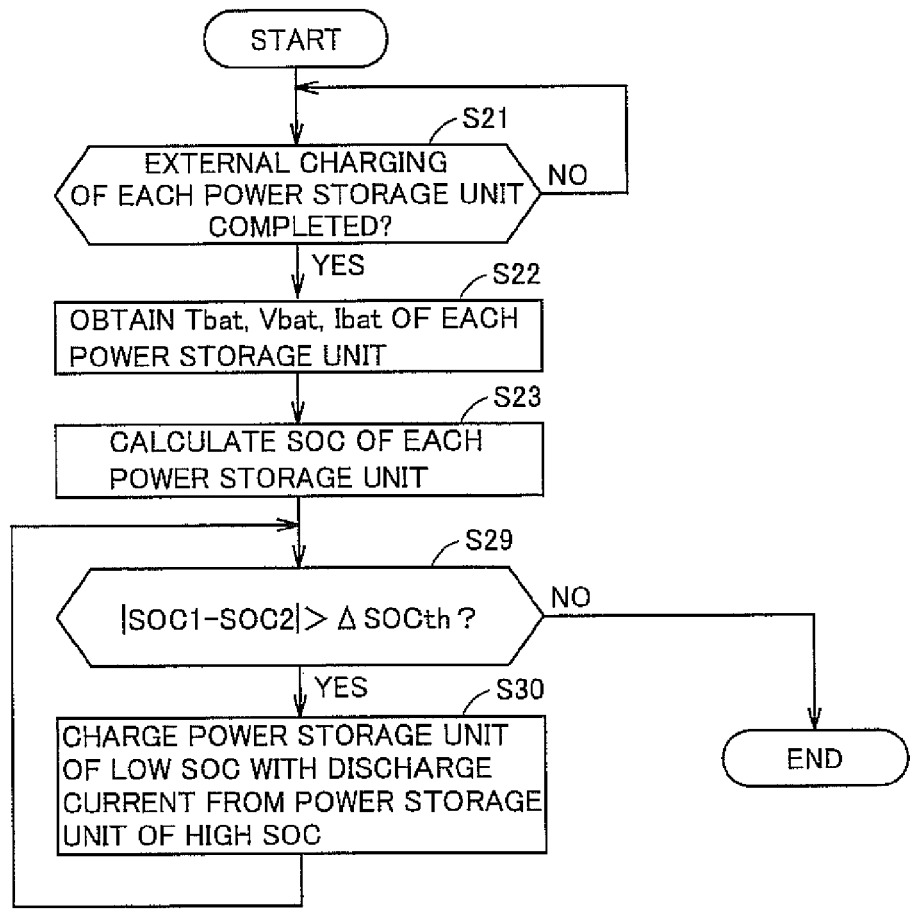
FIG. 16 is a flowchart representing an SOC control structure in accordance with Embodiment 6 of the present invention.

FIG. 16 is a flowchart representing a control structure for SOC of the power storage unit, in accordance with Embodiment 6 of the present invention. The process of each of the steps shown in FIG. 16 can be realized by controller 2B functioning as each control block shown in FIG. 7.

Referring to FIG. 16, converter control unit 210 determines whether external charging of each power storage unit has been completed, based on SOC successively calculated by state estimating unit 204 (step S21). If external charging of any of the power storage units has not been completed (NO at step S21), the process returns to the start.

In contrast, if external charging of all power storage units has been completed (YES at step S21), converter control unit 210 stops voltage converting operations of converters 6-1 and 6-2. State estimating unit 204 obtains battery temperatures Tbat1 and Tbat2, battery voltages Vbat1 and Vbat2, and battery currents Ibat1 and Ibat2 of power storage units 4-1 and 4-2, respectively, from various sensors (FIG. 1) (step S22).

State estimating unit 204 estimates SOC of each of power storage units 4-1 and 4-2, based on battery temperatures Tbat1 and Tbat2, battery voltages Vbat1 and Vbat2, battery currents Ibat1 and Ibat2, and so on (step S23).

Receiving SOC of each of power storage units 4-1 and 4-2 from state estimating unit 204, converter control unit 210 calculates difference $\Delta SOC$ ($=|SOC1-SOC2|$) between SOCs of power storage units 4-1 and 4-2, by subtracting SOC2 of second power storage unit 4-2 from SOC1 of first power storage unit 4-1. Then, converter control unit 210 determines whether or not the calculated SOC difference $\Delta SOC$ exceeds a preset prescribed threshold value $\Delta SOCth$ (step S29).

The prescribed threshold value $\Delta SOCth$ is variably set in accordance with SOC of that power storage unit which has higher SOC. In the degradation characteristics of the power storage unit shown in FIG. 3, in the range where SOC is relatively low, inclination of degradation ratio per unit time with respect to SOC is moderate, while in the range where SOC is relatively high, the inclination is steep. Therefore, by setting the prescribed threshold $\Delta SOCth$ to be smaller as SOC becomes higher, it is possible to effectively prevent increased variation in degradation ratio among the power storage units.

If the SOC difference $\Delta SOC$ between power storage units 4-1 and 4-2 is equal to or smaller than the prescribed threshold value $\Delta SOCth$ (NO at step S29), the process related to SOC control ends.

On the contrary, if the SOC difference $\Delta SOC$ between power storage units 4-1 and 4-2 exceeds the prescribed threshold value $\Delta SOCth$ (YES at step S29), converter control unit 210 controls voltage converting operations of converters 6-1 and 6-2 in accordance with a method as described later, such that a power storage unit having low SOC is charged by discharge current from a power storage unit having high SOC (step S30). Then, the process returns to step S29.

Figure 17:
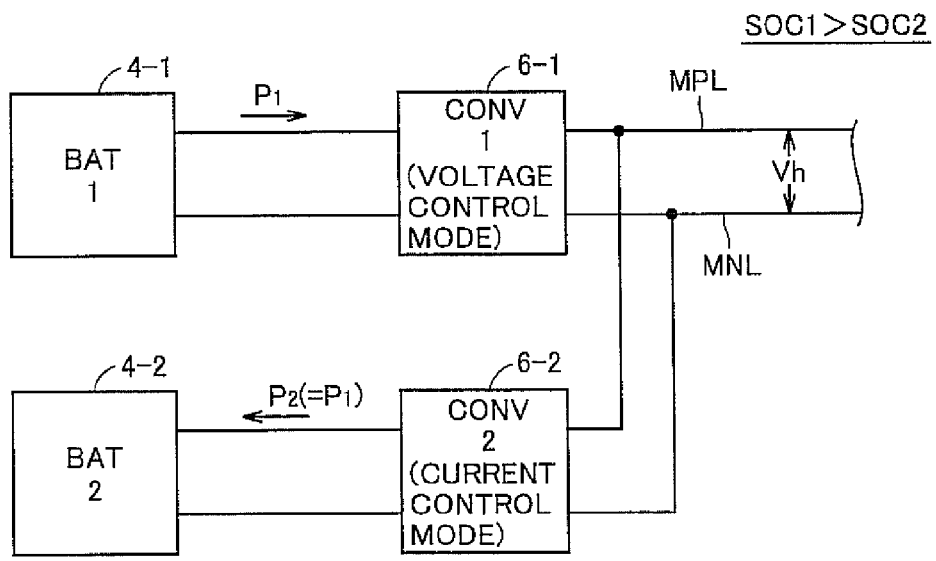
FIG. 17 illustrates power exchange between power storage units.

FIG. 17 illustrates power exchange between power storage units 4-1 and 4-2. FIG. 17 shows an example of power exchange when the SOC difference $\Delta SOC$ between the first and second power storage units 4-1 and 4-2 exceeds the prescribed threshold value $\Delta SOCth$ and SOC1 of the first power storage unit 4-1 is higher than SOC2 of the second power storage unit 4-2.

Referring to FIG. 17, converter control unit 210 controls voltage converting operations of converters 6-1 and 6-2 such that the second power storage unit 4-2 is charged by the discharge power P1 from the first power storage unit 4-1.

At this time, the first converter 6-1 is controlled such that SOC1 of first power storage unit 4-1 decreases at a prescribed change rate ($\Delta SOC1/dt$) set in advance. The reason is as follows. In order to perform power exchange in a short period of time, it is desirable to increase the charging/discharging current as much as possible. The increase of charging current, however, could be a factor that degrades the power storage unit.

The prescribed change rate ($\Delta SOC1/dt$) is converted to a change rate ($\Delta Vbat1/dt$) of battery voltage Vbat, based on battery characteristic of first power storage unit 4-1. Converter control unit 210 generates a target voltage value Vh* such that battery voltage Vbat1 changes at the converted change rate. Specifically, target voltage value Vh* changes at a change rate following the change rate of SOC1. Consequently, input/output voltage value Vh is controlled to a voltage level that is necessary and sufficient to reduce SOC1 of first power storage unit 4-1, and hence, it is not boosted to a wastefully high voltage. Accordingly, power loss generated at first converter 6-1 can be reduced.

Then, converter control unit 210 generates a switching command PWC1 to control first converter 6-1 such that the input/output voltage value Vh attains to the target voltage value Vh* (hereinafter also referred to as "voltage control mode"). At the same time, converter control unit 210 generates a switching command PWC2 to control second converter 6-2 such that battery current Ibat2 attains to a prescribed target current value (hereinafter also referred to as "current control mode").

If the discharge power from first power storage unit 4-1 exceeds tolerable charging power of second power storage unit 4-2, the excessive electric power may be consumed, for example, by air conditioner 40.

Figure 18:
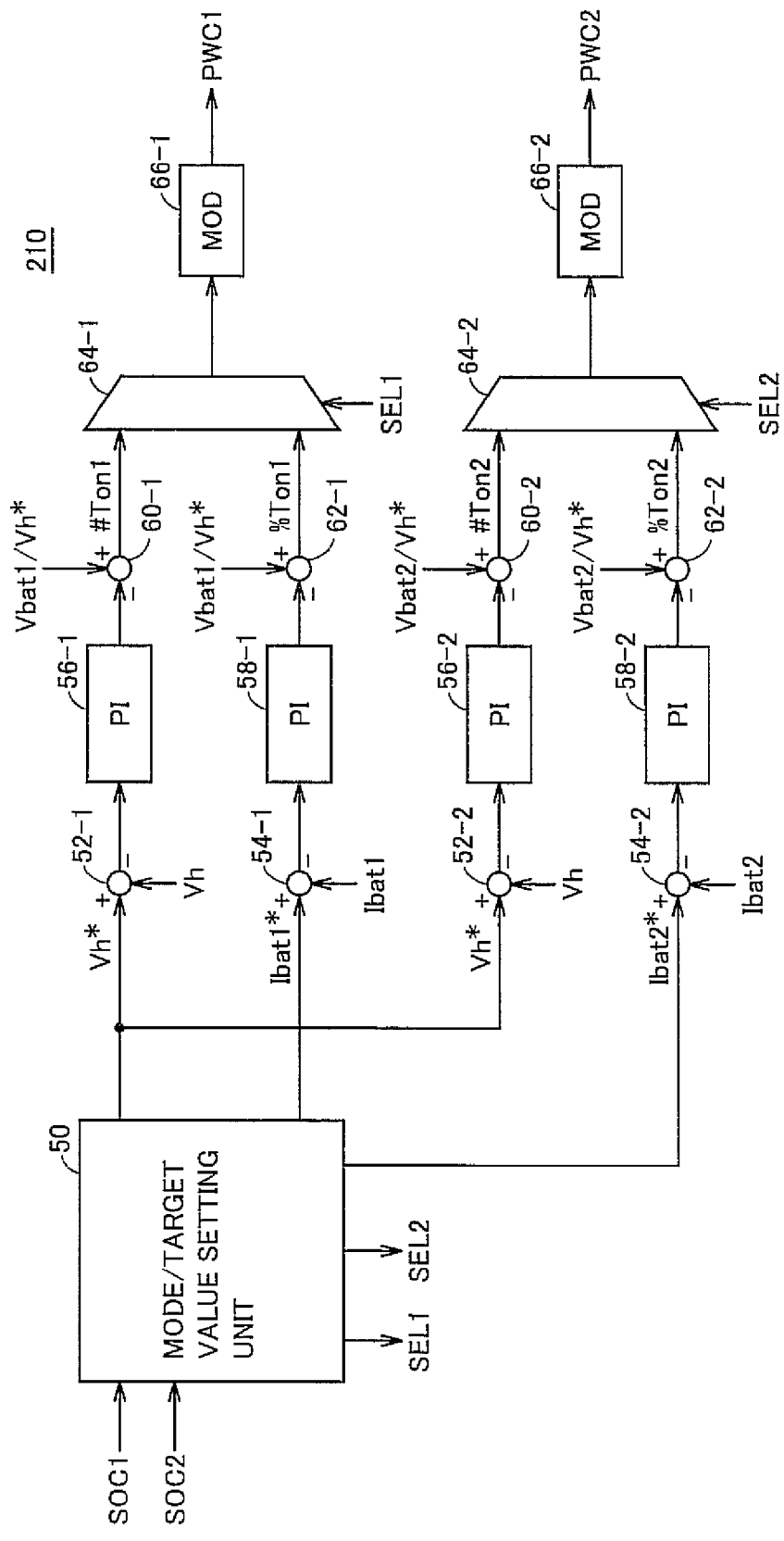
FIG. 18 is a block diagram for realizing generation of a switching command at a converter control unit.

FIG. 18 is a block diagram for realizing generation of switching commands by converter control unit 210.

Referring to FIG. 18, converter control unit 210 includes a mode/target value determining unit 50, subtracting units 52-1, 52-2, 54-1, 54-2, 60-1, 60-2, 62-1 and 62-2, proportional control (PI) units 56-1, 56-2, 58-1 and 58-2, selecting units 64-1 and 64-2, and modulating units (MOD) 66-1 and 66-2.

Receiving SOC1 of first power storage unit 4-1 and SOC2 of second power storage unit 4-2 from state estimating unit 204 (FIG. 7), mode/target value determining unit 50 determines whether the difference between SOC1 and SOC2 (=|SOC1−SOC2|) exceeds the prescribed threshold value ΔSOCth or not. If the SOC difference exceeds the prescribed threshold value ΔSOCth, mode/target value determining unit 50 determines the control mode (voltage control mode and current control mode) of the first converter 6-1 and the control mode (voltage control mode and current control mode) of the second converter 6-2, based on the magnitude relation of SOC1 and SOC2.

At this time, mode/target value determining unit 50 determines such that the converter corresponding to the power storage unit having higher SOC enters the voltage control mode and the converter corresponding to the power storage unit having lower SOC enters the current control mode. Then, mode/target value determining unit 50 outputs mode selection commands SEL1 and SEL2 to selecting units 64-1 and 64-2, respectively, in accordance with the determined control modes.

Further, mode/target value setting unit 50 determines target voltage value and target current value in accordance with the determined respective control modes. Specifically, when the first converter 6-1 is determined to operate in the voltage control mode, mode/target value setting unit 50 determines the target voltage value Vh* based on the change rate (ΔVbat1/dt) of battery voltage Vbat1 of first power storage unit 4-1. If the first converter 6-1 is determined to operate in the current control mode, mode/target value determining unit 50 determines a target power value in a range not exceeding the tolerable power of first power storage unit 4-1, and by dividing the determined target power value by the battery voltage Vbat1 of first power storage unit 4-1, calculates the target current value Ibat1* of first power storage unit 4-1.

Similarly, when the second converter 6-2 is determined to operate in the voltage control mode, mode/target value setting unit 50 determines the target voltage value Vh* based on the change rate (ΔVbat2/dt) of battery voltage Vbat2 of second power storage unit 4-2. If the second converter 6-2 is determined to operate in the current control mode, mode/target value determining unit 50 determines a target power value in a range not exceeding the tolerable power of second power storage unit 4-2, and by dividing the determined target power value by the battery voltage Vbat2 of second power storage unit 4-2, calculates the target current value Ibat2* of second power storage unit 4-2.

Subtracting unit 52-1 calculates voltage deviation from the difference between the target voltage value Vh* and the input/output voltage value Vh, and outputs it to proportional control unit (PI) 56-1. Proportional control unit 56-1 is formed to include at least a proportional element (P) and an integral element (I), and outputs an operation signal in accordance with the input voltage deviation to subtracting unit 60-1.

Subtracting unit 60-1 inverts the sign of operation signal output from proportional control unit 56-1, and by adding charge/discharge voltage value Vbat1 of first power storage unit 4-1/target voltage value Vh* (inverse of theoretical boosting ratio of first converter 6-1), outputs a duty command (voltage control mode) # Ton1. The duty command (voltage control mode) # Ton1 is a control command that defines the on-duty of a transistor forming the lower arm of first converter 6-1 in the voltage control mode.

Subtracting unit 54-1 calculates current deviation from the difference between the target current value Ibat1* and the battery current value Ibat1, and outputs it to proportional control unit (PI) 58-1. Similar to proportional control unit 56-1 described above, proportional control unit 58-1 is formed to include at least a proportional element and an integral element, and outputs an operation signal in accordance with the input current deviation to subtracting unit 62-1.

Subtracting unit 62-1 inverts the sign of operation signal output from proportional control unit 58-1 and by adding charge/discharge voltage value Vbat1 of first power storage unit 4-1/target voltage value Vh* (inverse of theoretical boosting ratio of first converter 6-1), outputs a duty command (current control mode) % Ton1. The duty command (current control mode) % Ton1 is a control command that defines the on-duty of a transistor forming the lower arm of first converter 6-1 in the current control mode.

Further, selecting unit 64-1 receives duty command (voltage control mode) # Ton1 and duty command (current control mode) % Ton1, selects either one based on a mode selection command SEL1 from mode/target value determining unit 50, and outputs it as a duty command Ton1 to modulating unit 66-1.

Modulating unit 66-1 compares a carrier wave generated by an oscillating unit, not shown, with the duty command Ton1, generates a switching command PWC1, and thereby controls first converter 6-1.

Further, subtracting unit 52-2 calculates voltage deviation from the difference between the target voltage value Vh* and the input/output voltage value Vh, and outputs it to proportional control unit (PI) 56-2. Similar to proportional control unit 56-1 described above, proportional control unit 56-2 is formed to include at least a proportional element and an integral element, and outputs an operation signal in accordance with the input voltage deviation to subtracting unit 60-2.

Subtracting unit 60-2 inverts the sign of operation signal output from proportional control unit 56-2, and by adding charge/discharge voltage value Vbat2 of second power storage unit 4-2/target voltage value Vh* (inverse of theoretical boosting ratio of second converter 6-2), outputs a duty command (voltage control mode) #Ton2. The duty command (voltage control mode) #Ton2 is a control command that defines the on-duty of a transistor forming the lower arm of second converter 6-2 in the voltage control mode.

Subtracting unit 54-2 calculates current deviation from the difference between the target current value Ibat2* and the battery current value Ibat2, and outputs it to proportional control unit (PI) 58-2. Similar to proportional control unit 56-1 described above, proportional control unit 58-2 is formed to include at least a proportional element and an integral element, and outputs an operation signal in accordance with the input current deviation to subtracting unit 62-2.

Subtracting unit 62-2 inverts the sign of operation signal output from proportional control unit 58-2 and by adding charge/discharge voltage value Vbat2 of second power storage unit 4-2/target voltage value Vh* (inverse of theoretical boosting ratio of second converter 6-2), outputs a duty command (current control mode) % Ton2. The duty command (current control mode) % Ton2 is a control command that defines the on-duty of a transistor forming the lower arm of second converter 6-2 in the current control mode.

Further, selecting unit 64-2 receives duty command (voltage control mode) #Ton2 and duty command (current control mode) % Ton2, selects either one based on a mode selection command SEL2 from mode/target value determining unit 50, and outputs it as a duty command Ton2 to modulating unit 66-2.

Modulating unit 66-2 compares a carrier wave generated by an oscillating unit, not shown, with the duty command Ton2, generates a switching command PWC2, and thereby controls second converter 6-2.

As to the functions of block diagram shown in FIG. 18, converter control unit 210 may be configured to include circuits that correspond to respective blocks. In most cases, however, the functions are realized by converter control unit 210 executing a process routine in accordance with a pre-set program.

Figure 19:
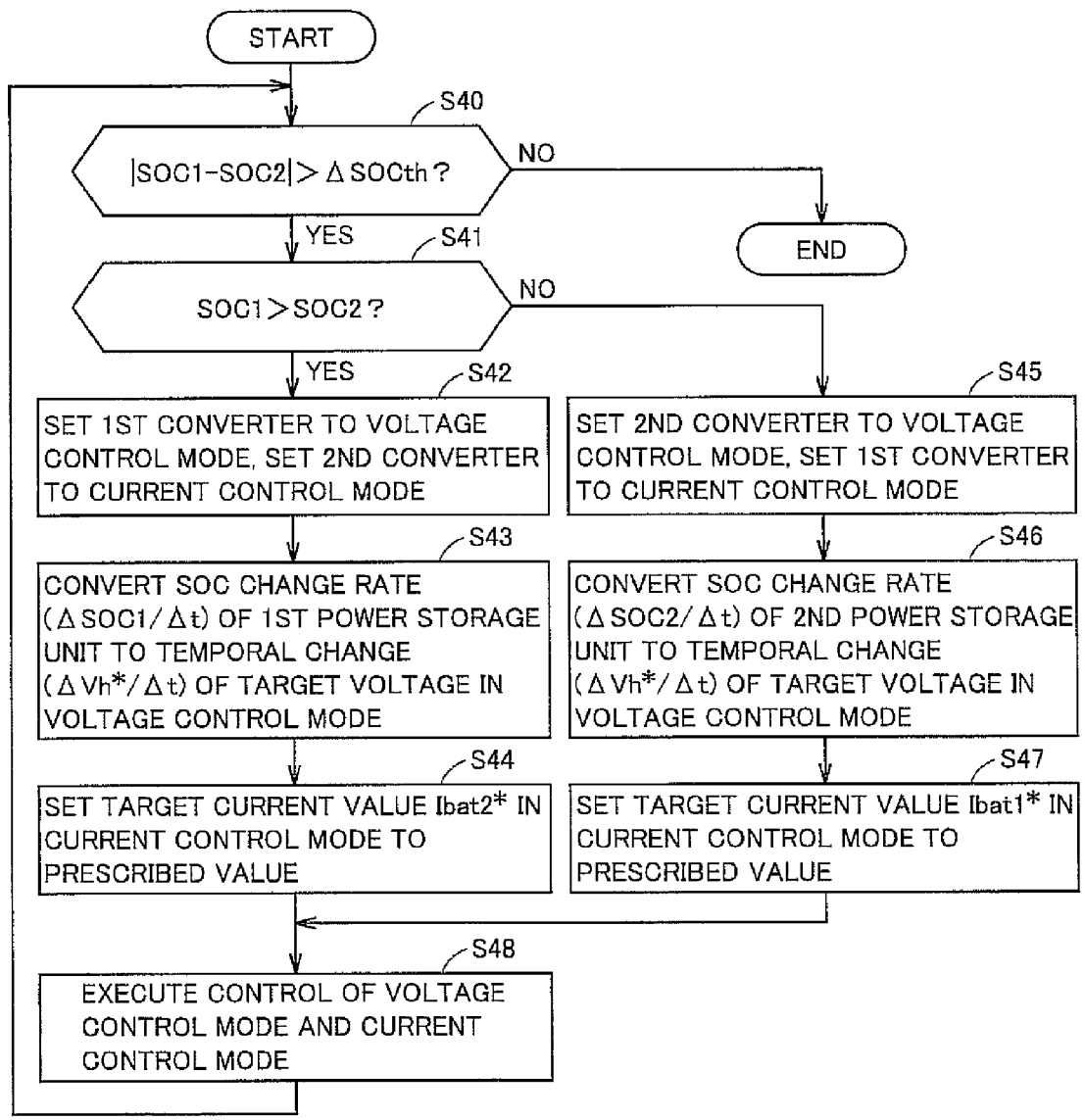
FIG. 19 is a flowchart showing a control structure for realizing generation of a switching command at the converter control unit.

FIG. 19 is a flowchart representing a control structure for realizing generation of switching commands in converter control unit 210.

Referring to FIG. 19, obtaining SOC of each of power storage units 4-1 and 4-2 from state estimating unit 204, converter control unit 210 subtracts SOC2 of second power storage unit 4-2 from SOC1 of first power storage unit, to calculate SOC difference ΔSOC (=|SOC1−SOC2|) between power storage units 4-1 and 4-2. Then, converter control unit 210 determines whether the calculated SOC difference ΔSOC exceeds a preset prescribed threshold value ΔSOCth or not (step S40).

If the SOC difference ΔSOC between power storage units 4-1 and 4-2 exceeds the prescribed threshold value ΔSOCth (YES at step S40), converter control unit 210 further determines whether or not SOC1 of first power storage unit 4-1 is higher than SOC2 of second power storage unit 4-2 (step S41).

If SOC1 of first power storage unit 4-1 is higher than SOC2 of second power storage unit 4-2 (YES at step S41), converter control unit 210 sets the first converter 6-1 to the voltage control mode and sets the second converter 6-2 to the current control mode (step S42).

Then, converter control unit 210 converts the prescribed change rate (ΔSOC1/dt) of SOC1 to a change rate (ΔVbat1/dt) of battery voltage Vbat1, based on battery characteristic of first power storage unit 4-1, and generates a target voltage value Vh* to change at a change rate following the change rate of battery voltage Vbat1 (step S43).

Further, converter control unit 210 determines a target power value in a range not exceeding the tolerable power of second power storage unit 4-2, and by dividing the determined target power value by the battery voltage Vbat2 of second power storage unit 4-2, calculates the target current value Ibat2* of second power storage unit 4-2 (step S44). Then, converter control unit 210 executes the voltage control mode and the current control mode (step S48).

In contrast, if SOC1 of first power storage unit 4-1 is lower than SOC2 of second power storage unit 4-2 (NO at step S41), that is, if SOC2 of second power storage unit 4-2 is higher than SOC1 of first power storage unit 4-1, converter control unit 210 sets the second converter 6-2 to the voltage control mode and sets the first converter 6-1 to the current control mode (step S45).

Then, converter control unit 210 converts the prescribed change rate (ΔSOC2/dt) of SOC2 to a change rate (ΔVbat2/dt) of battery voltage Vbat2, based on battery characteristic of second power storage unit 4-2, and generates a target voltage value Vh* to change at a change rate following the change rate of battery voltage Vbat2 (step S46).

Further, converter control unit 210 determines a target power value in a range not exceeding the tolerable power of first power storage unit 4-1, and by dividing the determined target power value by the battery voltage Vbat1 of first power storage unit 4-1, calculates the target current value Ibat1* of first power storage unit 4-1 (step S47). Then, converter control unit 210 executes the voltage control mode and the current control mode (step S48).

As described above, when the vehicle includes two power storage units 4-1 and 4-2, it is possible to move the charging power of one power storage unit having higher SOC to the other power storage unit having lower SOC to maintain constant SOC of the power storage units as a whole and to prevent degradation of said one power storage unit. If the vehicle has only one power storage unit, the charging power of the power storage unit may be consumed by a discharge resistance.

As described above, according to Embodiment 6 of the present invention, even when the vehicle is left unused after completion of external charging, SOC of power storage unit is controlled and, therefore increase in the degree of degradation caused by abrupt increase of battery temperature while the vehicle is left unused can be reduced.

Though a vehicle having two power storage units 4-1 and 4-2 has been described above, the present invention is clearly applicable to a vehicle having one of the power storage units 4-1 and 4-2 or to a vehicle having three or more power storage units.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A power supply system supplying electric power to a load device mounted on a vehicle, comprising:
   a rechargeable power storage device;
   a temperature detecting unit that detects a temperature of said power storage device;
   a state estimating unit that estimates a state of charge of said power storage device;
   a charging unit that externally charges said power storage device by receiving electric power from an external power source; and a control unit that controls charging/discharging of said power storage device;

wherein said control unit includes:

a target value setting unit that sets, when said power storage device attains to a state ready for charging by the external power source, a target state of charge of said power storage device in accordance with the temperature of said power storage device, and a charge control unit that controls charging power to said power storage device such that state of charge of said power storage device attains to said target state of charge, and said target value setting unit sets said target state of charge to be smaller as the temperature of said power storage device becomes higher, and said target value setting unit predicts degradation ratio of said power storage device at a time point of completion of external charging, based on degradation characteristic of said power storage device in connection with the state of charge and the temperature of said power storage device obtained in advance, and sets said target state of charge in accordance with the temperature of said power storage device such that predicted degradation ratio does not exceed tolerable degradation ratio at the time point of completion of external charging.

2. The power supply system according to claim 1, wherein said control unit further includes a estimating unit that obtains a required time period necessary from a starting time point of external charging until the external charging is completed and said power storage device is used, and estimating temporal change of temperature and state of charge of said power storage device in said required time period, and a degradation amount predicting unit that predicts an amount of degradation of said power storage device in said required time period, based on the temporal change of temperature and state of charge of said power storage device estimated by said estimating unit, said target value setting unit includes a determining unit that determines whether the amount of degradation of said power storage device predicted by said degradation amount predicting unit exceeds a preset tolerable amount of degradation or not, and a target value correcting unit that corrects said target state of charge in accordance with a result of determination of said determination unit.

3. The power supply system according to claim 2, wherein said target value correcting unit decreases said target state of charge, if the amount of degradation of said power storage device in said required time period is determined to exceed said tolerable amount of degradation by said determining unit.

4. The power supply system according to claim 1, further comprising a cooling mechanism that cools said power storage device using a cooling medium; wherein said control unit further includes a second estimating unit that obtains a required time period necessary from a starting time point of external charging until the external charging is completed and said power storage device is used, and estimating temporal change of temperature and state of charge of said power storage device in said required time period, a degradation amount predicting unit that predicts an amount of degradation of said power storage device in said required time period, based on the temporal change of temperature and state of charge of said power storage device estimated by said second estimating unit, a determining unit that determines whether the amount of degradation of said power storage device predicted by said degradation amount predicting unit exceeds a preset tolerable amount of degradation or not, and a temperature control unit that controls cooling performance of said cooling mechanism during execution of external charging, in accordance with a result of determination of said determining unit.

5. The power supply system according to claim 4, wherein said temperature control unit raises cooling performance of said cooling mechanism during execution of external charging, if the amount of degradation of said power storage device in said required time period is determined to exceed said tolerable amount of degradation by said determining unit.

6. The power supply system according to claim 2, wherein said control unit further includes a storage unit that learns a pattern of use of said power supply system and stores a learned value based on the learning; and said estimating unit that obtains said required time period based on the learned value stored in said storage unit.

7. The power supply system according to claim 1, wherein said control unit further includes a power storage device control unit that predicts an amount of degradation of said power storage device in an unused time period from the completion of external charging until said power storage device is used, based on degradation characteristic of said power storage device in connection with the state of charge and the temperature of said power storage device obtained in advance, and controls at least one of the temperature and the state of charge of said power storage device in said unused time period such that the amount of degradation of said power storage device in a required time period necessary from a starting time point of external charging until the external charging is completed and said power storage device is used, does not exceed a preset tolerable amount of degradation.

8. The power supply system according to claim 1, wherein said power storage device includes a plurality of power storage units each formed to be rechargeable;

said power supply system further comprising:

a plurality of voltage converting units provided corresponding to said plurality of power storage units, respectively; and a pair of power lines to which said plurality of voltage converting units are connected in parallel with each other; wherein said state estimating unit estimates state of charge of each of said plurality of power storage units in an unused time period of said power storage device from a time point of completion of external charging until said power storage device is used; and said control unit further includes a voltage conversion control unit that controls said plurality of voltage converting units such that electric power is exchanged between a first power storage unit having relatively high state of charge and a second power storage unit having relatively low state of charge, if difference in state of charge between each of said plurality of power storage units exceeds a prescribed threshold value in said unused time period.

9. A vehicle, comprising:

a power supply system; and a driving force generating unit receiving electric power supplied from said power supply system and generating driving force; wherein said power supply system includes a rechargeable power storage device;

a temperature detecting unit that detects a temperature of said power storage device;

a state estimating unit that estimates a state of charge of said power storage device;

a charging unit that externally charges said power storage device by receiving electric power from an external power source; and a control unit that controls charging/discharging of said power storage device;

wherein said control unit includes:

a target value setting unit that sets, when said power storage device attains to a state ready for charging by the external power source, a target state of charge of said power storage device in accordance with the temperature of said power storage device, and a charge control unit that controls charging power to said power storage device such that state of charge of said power storage device attains to said target state of charge, and said target value setting unit sets said target state of charge to be smaller as the temperature of said power storage device becomes higher, said target value setting unit predicts degradation ratio of said power storage device at a time point of completion of external charging, based on degradation characteristic of said power storage device in connection with the state of charge and the temperature of said power storage device obtained in advance, and sets said target state of charge in accordance with the temperature of said power storage device such that predicted degradation ratio does not exceed tolerable degradation ratio at the time point of completion of external charging.

10. The power supply system according to claim 1, further comprising:

a temperature predicting unit that predicts the temperature of said power storage device at the time point of completion of external charging, by estimating degree of temperature increase of said power storage device during execution of external charging, and said target value setting unit sets said target state of charge in accordance with the predicted temperature of said power storage device at the time point of completion of external charging.

\* \* \* \* \*